(12) United States Patent
Nakashima

(10) Patent No.: US 6,822,492 B2
(45) Date of Patent: Nov. 23, 2004

(54) VARIABLE-FREQUENCY PULSE GENERATOR

(75) Inventor: Yasuhiro Nakashima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/790,198

(22) Filed: Mar. 2, 2004

(65) Prior Publication Data

US 2004/0164774 A1 Aug. 26, 2004

Related U.S. Application Data

(63) Continuation of application No. 10/203,405, filed as application No. PCT/JP01/11020 on Dec. 17, 2001, now abandoned.

(30) Foreign Application Priority Data

Jan. 17, 2001 (JP) .................................... 2001-009523

(51) Int. Cl.[7] .............................................. H03K 21/00
(52) U.S. Cl. ...................................... 327/115; 327/113
(58) Field of Search ........................ 327/113–115, 117; 377/47, 48

(56) References Cited

U.S. PATENT DOCUMENTS 4,432,065 A * 2/1984 Heinle ........................ 708/101
4,805,199 A   2/1989 Muramatsu
5,870,238 A * 2/1999 Lee ............................. 360/51

FOREIGN PATENT DOCUMENTS

| JP | 60-187123 | 9/1985 |
| JP | 64-73812 | 3/1989 |
| JP | 9-261015 | 10/1997 |
| JP | 11-220364 | 8/1999 |
| JP | 2000-78048 | 10/2000 |

\* cited by examiner

Primary Examiner—Timothy P. Callahan
Assistant Examiner—Cassandra Cox
(74) Attorney, Agent, or Firm—Sughrue Mion, PLLC

(57) ABSTRACT

The output ($\theta 2$) of a digital adder (13) before being held by a first data holding circuit (14), a first reference value (D1) and a second reference value (D2) are compared, respectively, by a first data comparator (15) and a second data comparator (16), to thereby change one cycle of the output control of the pulse train fout from four cycles (T1–T4) to two cycles (T1–T2) of the reference clock. Further, by comparing the output ($\theta 1$) of the first data holding circuit (14) and the first reference value (D1) by a third data comparator (19), the latch timing of the overflow signal is changed from T4 to T1.

26 Claims, 13 Drawing Sheets

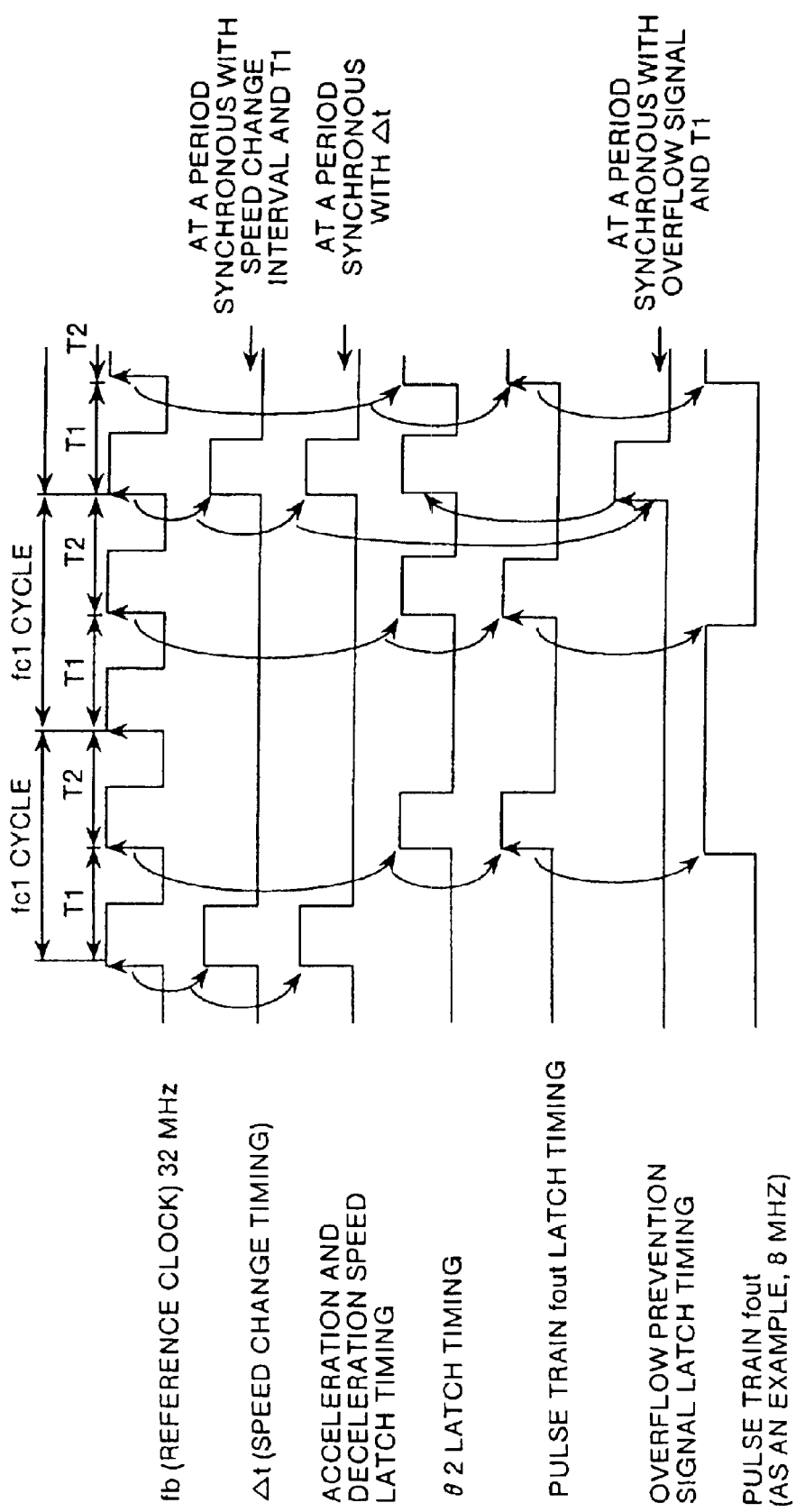

FIG.3

| ELAPSED TIME [S] | Vp×n[Hz×n] | OUTPUT VALUE θ1 OF FIRST DATA HOLDING CIRCUIT 14 | OVERFLOW SIGNAL θ1≧ D1 WHEN 1 | OUTPUT VALUE θ2 OF DIGITAL ADDER 13 | VALUE fd | VALUE fout (LATCHED AT T2) |
|---|---|---|---|---|---|---|
| 0/32,000,000 | 0 (INITIAL VALUE) | 0 (INITIAL VALUE) | 0 (INITIAL VALUE) | 0 (INITIAL VALUE) | 0 (INITIAL VALUE) | 0 (INITIAL VALUE) |
| 1/32,000,000 (T1) | 8,000,000 | 0 | 0 | θ1+Vp×n=8,000,000 | 0 | 0 |
| 2/32,000,000 (T2) | 8,000,000 | θ2 IMMEDIATELY BEFORE = 8,000,000 | 0 | θ1+Vp×n=16,000,000 | 1 | fd IMMEDIATELY BEFORE = 0 |
| 3/32,000,000 (T1) | 8,000,000 | HOLD PREVIOUS θ1 = 8,000,000 | 0 | θ1+Vp×n=16,000,000 | 1 | 0 |
| 4/32,000,000 (T2) | 8,000,000 | θ2 IMMEDIATELY BEFORE = 16,000,000 | 0 | θ1+Vp×n=24,000,000 | 1 | fd IMMEDIATELY BEFORE = 1 |
| 5/32,000,000 (T1) | 8,000,000 | HOLD PREVIOUS θ1 = 16,000,000 | 0 | θ1+Vp×n=24,000,000 | 1 | 1 |
| 6/32,000,000 (T2) | 8,000,000 | θ2 IMMEDIATELY BEFORE = 24,000,000 | 0 | θ1+Vp×n=32,000,000 | 0 | fd IMMEDIATELY BEFORE = 1 |
| 7/32,000,000 (T1) | 8,000,000 | HOLD PREVIOUS θ1 = 24,000,000 | 0 | θ1+Vp×n=32,000,000 | 0 | 1 |
| 8/32,000,000 (T2) | 8,000,000 | θ2 IMMEDIATELY BEFORE = 32,000,000 | 1 | θ1−D1=0 | 1 | fd IMMEDIATELY BEFORE = 0 |
| 9/32,000,000 (T1) | 16,000,000 | θ2 IMMEDIATELY BEFORE = 0 | 0 | θ1+Vp×n=16,000,000 | 0 | 0 |
| 10/32,000,000 (T2) | 16,000,000 | θ2 IMMEDIATELY BEFORE = 32,000,000 | 0 | θ1+Vp×n=32,000,000 | 0 | fd IMMEDIATELY BEFORE = 1 |
| 11/32,000,000 (T1) | 16,000,000 | HOLD PREVIOUS θ1 = 16,000,000 | 0 | θ1+Vp×n=32,000,000 | 0 | 1 |
| 12/32,000,000 (T2) | 16,000,000 | θ2 IMMEDIATELY BEFORE = 32,000,000 | 1 | θ1−D1=0 | 1 | fd IMMEDIATELY BEFORE = 0 |
| 13/32,000,000 (T1) | 16,000,000 | θ2 IMMEDIATELY BEFORE = 0 | 0 | θ1+Vp×n=16,000,000 | 0 | 0 |
| 14/32,000,000 (T2) | 16,000,000 | θ2 IMMEDIATELY BEFORE = 16,000,000 | 0 | θ1+Vp×n=32,000,000 | 0 | fd IMMEDIATELY BEFORE = 1 |
| 15/32,000,000 (T1) | 16,000,000 | HOLD PREVIOUS θ1 = 16,000,000 | 0 | θ1+Vp×n=32,000,000 | 0 | 1 |
| 16/32,000,000 (T2) | 16,000,000 | θ2 IMMEDIATELY BEFORE = 32,000,000 | 1 | θ1−D1=0 | 0 | fd IMMEDIATELY BEFORE = 0 |

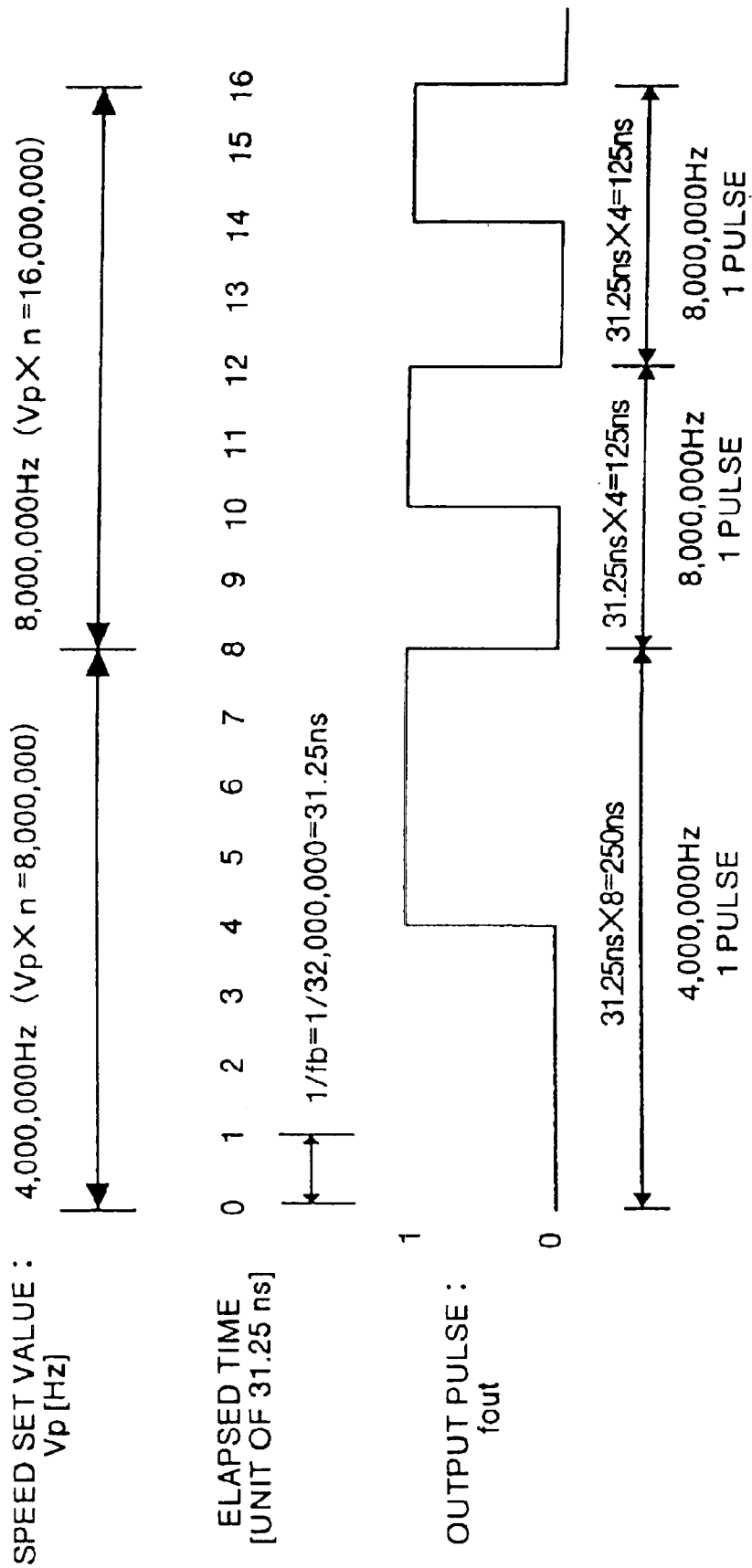

FIG.7

| ELAPSED TIME [S] | VpXn[HzXn] | OUTPUT VALUE θ1 OF FIRST DATA HOLDING CIRCUIT 14 | OUTPUT VALUE OF DIGITAL ADDER 21 θ1+VpXn=θ2 | OUTPUT VALUE OF DIGITAL SUBTRACTER 22 θ2−D1=θ3 | VALUE PIN θ2 or θ3 | VALUE fd | VALUE FOUT (LATCHED AT T2) |
|---|---|---|---|---|---|---|---|
| 0/32,000,000 | 0 (INITIAL VALUE) | 0 (INITIAL VALUE) | 0 (INITIAL VALUE) | 0 (INITIAL VALUE) | 0 (INITIAL VALUE) | 0 (INITIAL VALUE) | 0 (INITIAL VALUE) |
| 1/32,000,000 (T1) | 8,000,000 | 0 | 8,000,000 | −24,000,000 | θ2 | 0 | 0 |
| 2/32,000,000 (T2) | 8,000,000 | Pin IMMEDIATELY BEFORE = 8,000,000 | 16,000,000 | −16,000,000 | θ2 | 1 | fd IMMEDIATELY BEFORE = 0 |
| 3/32,000,000 (T1) | 8,000,000 | HOLD PREVIOUS θ1 = 8,000,000 | 16,000,000 | −16,000,000 | θ2 | 1 | 0 |
| 4/32,000,000 (T2) | 8,000,000 | Pin IMMEDIATELY BEFORE = 16,000,000 | 24,000,000 | −8,000,000 | θ2 | 1 | fd IMMEDIATELY BEFORE = 1 |
| 5/32,000,000 (T1) | 8,000,000 | HOLD PREVIOUS θ1 = 16,000,000 | 24,000,000 | −8,000,000 | θ2 | 1 | 1 |
| 6/32,000,000 (T2) | 8,000,000 | Pin IMMEDIATELY BEFORE = 24,000,000 | 32,000,000 | 0 | θ3 | 0 | fd IMMEDIATELY BEFORE = 1 |
| 7/32,000,000 (T1) | 8,000,000 | HOLD PREVIOUS θ1 = 24,000,000 | 32,000,000 | 0 | θ3 | 0 | 1 |
| 8/32,000,000 (T2) | 16,000,000 | Pin IMMEDIATELY BEFORE = 0 | 8,000,000 | −24,000,000 | θ2 | 0 | fd IMMEDIATELY BEFORE = 0 |
| 9/32,000,000 (T1) | 16,000,000 | HOLD PREVIOUS θ1 = 0 | 16,000,000 | −16,000,000 | θ2 | 0 | 0 |
| 10/32,000,000 (T2) | 16,000,000 | Pin IMMEDIATELY BEFORE = 16,000,000 | 32,000,000 | 0 | θ3 | 0 | fd IMMEDIATELY BEFORE = 0 |
| 11/32,000,000 (T1) | 16,000,000 | HOLD PREVIOUS θ1 = 16,000,000 | 32,000,000 | 0 | θ3 | 0 | 1 |
| 12/32,000,000 (T2) | 16,000,000 | Pin IMMEDIATELY BEFORE = 0 | 16,000,000 | −16,000,000 | θ2 | 1 | fd IMMEDIATELY BEFORE = 0 |
| 13/32,000,000 (T1) | 16,000,000 | HOLD PREVIOUS θ1 = 0 | 16,000,000 | −16,000,000 | θ2 | 1 | 0 |
| 14/32,000,000 (T2) | 16,000,000 | Pin IMMEDIATELY BEFORE = 16,000,000 | 32,000,000 | 0 | θ3 | 0 | fd IMMEDIATELY BEFORE = 1 |
| 15/32,000,000 (T1) | 16,000,000 | HOLD PREVIOUS θ1 = 16,000,000 | 32,000,000 | 0 | θ3 | 0 | 1 |
| 16/32,000,000 (T2) | 16,000,000 | Pin IMMEDIATELY BEFORE = 0 | 16,000,000 | −16,000,000 | θ2 | 1 | fd IMMEDIATELY BEFORE = 0 |

FIG.9

| ELAPSED TIME [S] | Vp×n [Hz×n] | OUTPUT VALUE θ1 OF FIRST DATA HOLDING CIRCUIT 14 | OVERFLOW SIGNAL θ1≧D2 WHEN 1 | OUTPUT VALUE θ2 OF DIGITAL ADDER 13 | VALUE fd | VALUE fout (LATCHED AT T2) |
|---|---|---|---|---|---|---|
| 0/32,000,000 | 0 (INITIAL VALUE) | 0 (INITIAL VALUE) | 0 (INITIAL VALUE) | 0 (INITIAL VALUE) | 0 (INITIAL VALUE) | 0 (INITIAL VALUE) |
| 1/32,000,000 (T1) | 8,000,000 | | | θ1+Vp×n=8,000,000 | 0 | 0 |
| 2/32,000,000 (T2) | 8,000,000 | θ2 IMMEDIATELY BEFORE = 8,000,000 | 0 | θ1+Vp×n=16,000,000 | 1 | fd IMMEDIATELY BEFORE = 0 |
| 3/32,000,000 (T1) | 8,000,000 | HOLD PREVIOUS θ1 = 8,000,000 | | θ1+Vp×n=16,000,000 | 1 | 0 |
| 4/32,000,000 (T2) | 8,000,000 | θ2 IMMEDIATELY BEFORE = 16,000,000 | 1 (ODD NUMBER OF TIMES) | θ1−D2=0 | 1 | fd IMMEDIATELY BEFORE = 1 |
| 5/32,000,000 (T1) | 8,000,000 | θ2 IMMEDIATELY BEFORE = 0 | | θ1+Vp×n=8,000,000 | 0 | 1 |
| 6/32,000,000 (T2) | 8,000,000 | θ2 IMMEDIATELY BEFORE = 8,000,000 | 0 | θ1+Vp×n=16,000,000 | 1 | fd IMMEDIATELY BEFORE = 1 |
| 7/32,000,000 (T1) | 8,000,000 | HOLD PREVIOUS θ1 = 8,000,000 | | θ1+Vp×n=16,000,000 | 1 | 1 |
| 8/32,000,000 (T2) | 8,000,000 | θ2 IMMEDIATELY BEFORE = 16,000,000 | 1 (EVEN NUMBER OF TIMES) | θ1−D2=0 | 0 | fd IMMEDIATELY BEFORE = 1 |
| 9/32,000,000 (T1) | 16,000,000 | θ2 IMMEDIATELY BEFORE = 0 | | θ1+Vp×n=16,000,000 | 1 | 0 |
| 10/32,000,000 (T2) | 16,000,000 | θ2 IMMEDIATELY BEFORE = 16,000,000 | 1 (ODD NUMBER OF TIMES) | θ1−D2=0 | 0 | fd IMMEDIATELY BEFORE = 1 |
| 11/32,000,000 (T1) | 16,000,000 | θ2 IMMEDIATELY BEFORE = 0 | | θ1+Vp×n=16,000,000 | 1 | 0 |
| 12/32,000,000 (T2) | 16,000,000 | θ2 IMMEDIATELY BEFORE = 16,000,000 | 1 (EVEN NUMBER OF TIMES) | θ1−D2=0 | 0 | fd IMMEDIATELY BEFORE = 0 |
| 13/32,000,000 (T1) | 16,000,000 | θ2 IMMEDIATELY BEFORE = 0 | | θ1+Vp×n=16,000,000 | 1 | 0 |
| 14/32,000,000 (T2) | 16,000,000 | θ2 IMMEDIATELY BEFORE = 16,000,000 | 1 (ODD NUMBER OF TIMES) | θ1−D2=0 | 0 | fd IMMEDIATELY BEFORE = 1 |
| 15/32,000,000 (T1) | 16,000,000 | θ2 IMMEDIATELY BEFORE = 0 | | θ1+Vp×n=16,000,000 | 1 | 1 |
| 16/32,000,000 (T2) | 16,000,000 | θ2 IMMEDIATELY BEFORE = 16,000,000 | 1 (EVEN NUMBER OF TIMES) | θ1−D2=0 | 0 | fd IMMEDIATELY BEFORE = 0 |

FIG.11

| ELAPSED TIME [S] | Vp×n[Hz×n] | OUTPUT VALUE θ1 OF FIRST DATA HOLDING CIRCUIT 14 | OVERFLOW SIGNAL θ1>1 WHEN 1 | OUTPUT VALUE θ2 OF DIGITAL ADDER 13 | VALUE fd | VALUE fout (LATCHED AT T2) |
|---|---|---|---|---|---|---|
| 0/32,000,000 | 0 (INITIAL VALUE) | 0 (INITIAL VALUE) | 0 (INITIAL VALUE) | 0 (INITIAL VALUE) | 0 (INITIAL VALUE) | 0 (INITIAL VALUE) |
| 1/32,000,000 (T1) | 8,000,000 | 0 | 0 | θ1+Vp×n=8,000,000 | 0 | 0 |
| 2/32,000,000 (T2) | 8,000,000 | θ2 IMMEDIATELY BEFORE = 8,000,000 | 0 | θ1+Vp×n=16,000,000 | 1 | fd IMMEDIATELY BEFORE = 0 |
| 3/32,000,000 (T1) | 8,000,000 | HOLD PREVIOUS θ1 = 8,000,000 | 0 | θ1+Vp×n=16,000,000 | 1 | 0 |
| 4/32,000,000 (T2) | 8,000,000 | θ2 IMMEDIATELY BEFORE = 16,000,000 | 0 | θ1+Vp×n=24,000,000 | 1 | fd IMMEDIATELY BEFORE = 1 |
| 5/32,000,000 (T1) | 8,000,000 | HOLD PREVIOUS θ1 = 16,000,000 | 0 | θ1+Vp×n=24,000,000 | 1 | 1 |
| 6/32,000,000 (T2) | 8,000,000 | θ2 IMMEDIATELY BEFORE = 24,000,000 | 0 | θ1+Vp×n=32,000,000 | 0 | fd IMMEDIATELY BEFORE = 1 |
| 7/32,000,000 (T1) | 8,000,000 | HOLD PREVIOUS θ1 = 24,000,000 | 0 | θ1+Vp×n=32,000,000 | 0 | 1 |
| 8/32,000,000 (T2) | 8,000,000 | θ2 IMMEDIATELY BEFORE = 32,000,000 | 0 | θ1+Vp×n=40,000,000 | 0 | fd IMMEDIATELY BEFORE = 0 |
| 9/32,000,000 (T1) | 16,000,000 | HOLD PREVIOUS θ1 = 32,000,000 | 0 | θ1+Vp×n=48,000,000 | 1 | 0 |
| 10/32,000,000 (T2) | 16,000,000 | θ2 IMMEDIATELY BEFORE = 48,000,000 | 1 | θ1−D1=16,000,000 | 0 | fd IMMEDIATELY BEFORE = 1 |
| 11/32,000,000 (T1) | 16,000,000 | θ2 IMMEDIATELY BEFORE = 16,000,000 | 0 | θ1+Vp×n=32,000,000 | 0 | 1 |
| 12/32,000,000 (T2) | 16,000,000 | θ2 IMMEDIATELY BEFORE = 32,000,000 | 0 | θ1+Vp×n=48,000,000 | 1 | fd IMMEDIATELY BEFORE = 0 |
| 13/32,000,000 (T1) | 16,000,000 | HOLD PREVIOUS θ1 = 32,000,000 | 0 | θ1+Vp×n=48,000,000 | 1 | 0 |
| 14/32,000,000 (T2) | 16,000,000 | θ2 IMMEDIATELY BEFORE = 48,000,000 | 1 | θ1−D1=16,000,000 | 1 | fd IMMEDIATELY BEFORE = 1 |
| 15/32,000,000 (T1) | 16,000,000 | θ2 IMMEDIATELY BEFORE = 16,000,000 | 0 | θ1+Vp×n=32,000,000 | 0 | 1 |
| 16/32,000,000 (T2) | 16,000,000 | θ2 IMMEDIATELY BEFORE = 32,000,000 | 0 | θ1+Vp×n=48,000,000 | 1 | fd IMMEDIATELY BEFORE = 0 |

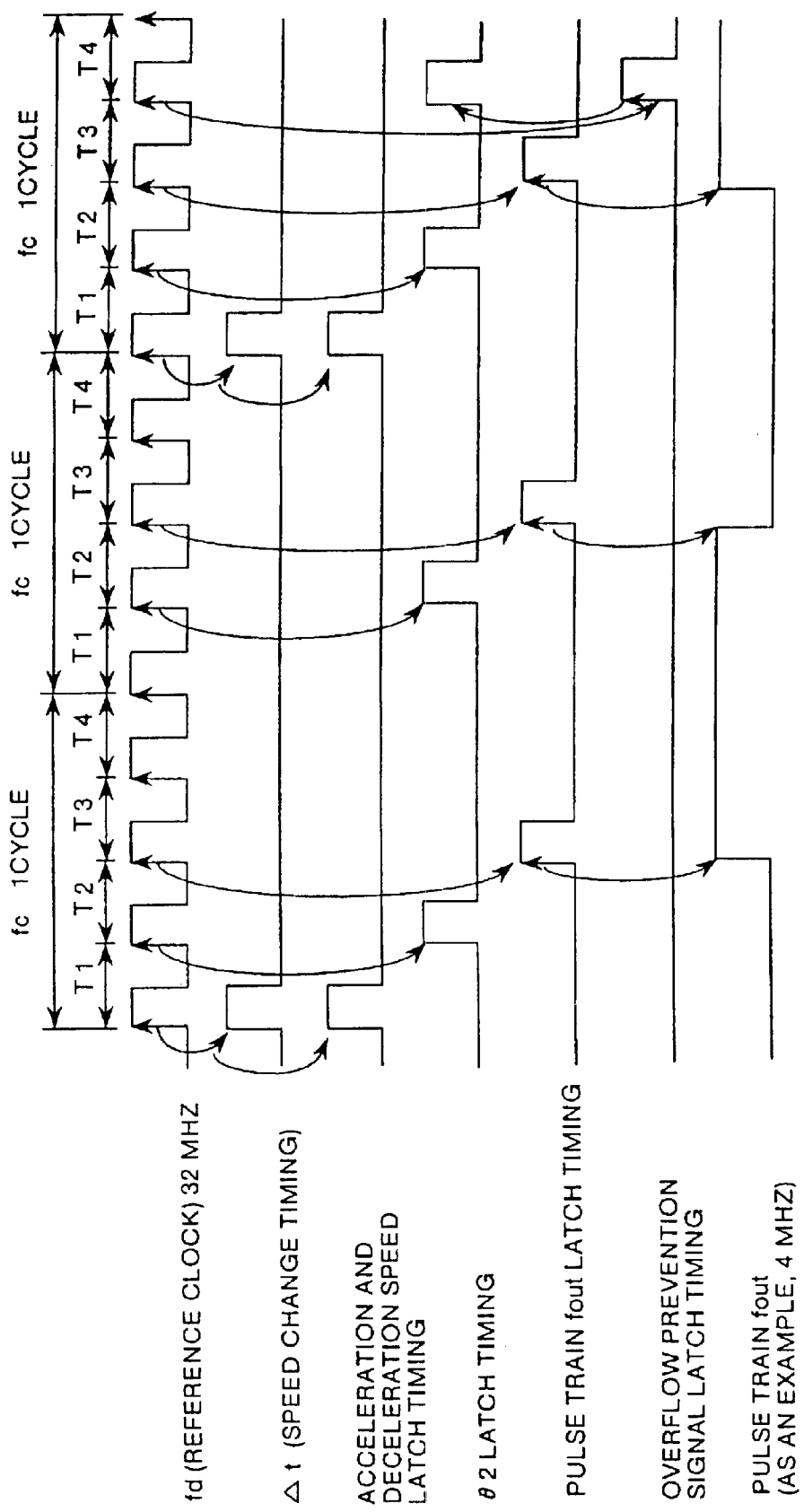

US 6,822,492 B2

VARIABLE-FREQUENCY PULSE GENERATOR

This is a continuation of application Ser. No. 10/203,405 filed Aug. 9, 2002, now abandoned, which is a National Stage Application filed under §371 of PCT Application No. PCT/JP01/11020 filed Dec. 17, 2001; the above noted prior applications are all hereby incorporated by reference.

TECHNICAL FIELD

The present invention relates to a variable-frequency pulse generator capable of generating a pulse of the desired frequency.

BACKGROUND ART

A conventional variable-frequency pulse generator will be explained below. A conventional variable-frequency pulse generator has been disclosed in Japanese Patent Application No. 11-220364. FIG. 12 shows a configuration of a variable-frequency pulse generator disclosed in the above publication.

In FIG. 12, the reference symbol 100 denotes a conventional variable-frequency pulse generation circuit, 101 denotes a bit inverter which inverts a first reference value D1, 102 denotes a data selector which selects either one of the output of the inverter 101 and a pulse number set value Ps, 103 denotes a digital adder which adds the output θ1 of a first data holding circuit described later and the output of the data selector 102, and 104 denotes the first data holding circuit which latches the output θ2 of the digital adder 103 at the timing T2 of a reference clock fb. The reference symbol 105 denotes a first data comparator which compares the output θ1 of the first data holding circuit 104 and the first reference value D1, and 106 denotes a second data comparator which compares the output θ1 of the first data holding circuit 104 and a second reference value D2. The reference symbol 107 denotes a pulse generation circuit which judges the output level (High or Low) based on the two comparison results, 108 denotes a second data holding circuit which latches the output fd of the pulse generation circuit 107 at the timing T3 of the reference clock fb and outputs a pulse train fout, and 109 denotes an overflow prevention circuit which outputs the overflow prevention signal fob synchronous with the reference clock fb based on the comparison result of the first data comparator 105.

The control clock frequency fc is [fb/4]. The first reference value D1 is [fc×n], and the second reference value D2 is [(fc/2)×n]. The pulse number set value per n seconds Ps is [Vp×n], and the value thereof can be set for 1 unit in the range of [0≦Ps≦{(fc/2)×n}]. n denotes the maximum cycle of the output pulse, and Vp denotes a speed set value.

The operation of the conventional variable-frequency pulse generator will now be explained. The inverter 101 outputs a bit inversion value of the reference value D1 in the 26-bit notation. When the S terminal is 0 (θ1≦D1), the data selector 102 outputs the pulse number set value Ps (26-bit notation) of a terminal A to a terminal Y, and when the S terminal is 1 (θ1>D1), the data selector 102 outputs the bit inversion value of the reference value D1 of a terminal B to the terminal Y.

When a CIN terminal is 0 (θ1≦D1), the digital adder 103 adds the pulse number set value Ps output from the data selector 102 and the output θ1 of the first data holding circuit 104, and when the CIN terminal is 1 (θ1>D1), the digital adder 103 adds −(fc×n), being the sum of the output of the data selector 102 and CIN=1, and the output θ1 of the first data holding circuit 104, and outputs the addition result θ2 (26-bit notation) for each case. The first data holding circuit 104 latches the addition result θ2 at the timing T2 of the reference clock fb and the overflow prevention signal fob, and outputs data θ1 (26-bit notation).

The first data comparator 105 compares the output θ1 of the first data holding circuit 104 and the first reference value D1, and when θ1>D1, outputs 1 as the overflow signal. The second data comparator 106 compares the output θ1 of the first data holding circuit 104 and the second reference value D2. The pulse generation circuit 107 judges the both comparison results, and for example, when the comparison results by the both comparators are 0≦θ2<D2 (=(fc/2)×n), outputs 0 as the judgment result fd, and when D2≦θ2<D1 (=fc×n), outputs 1, and when D1≦θ2, outputs 0. The second data holding circuit 108 latches the judgment result fd at the timing T3 of the reference clock fb, and outputs a pulse train fout.

The overflow prevention circuit 109 receives the overflow signal output from the first data comparator 105 at the timing T4 of the reference clock fb, and outputs an overflow prevention signal fob.

FIG. 13 is a timing chart which shows the operation of the conventional variable-frequency pulse generator. At first, the speed change timing Δt changes at a period synchronous with the timing T1 of the reference clock fb and the speed change timing, and acceleration and deceleration speed is latched at the timing T1 of the reference clock fb. This operation is executed by the part other than the configuration shown in FIG. 12.

The first data holding circuit 104 latches the output θ2 of the digital adder 103 at the timing T2 of the reference clock fb. The second data holding circuit 108 then latches the output fd of the pulse generation circuit 107 at the timing T3 of the reference clock fb, and outputs the pulse train fout.

The overflow prevention circuit 109 performs overflow prevention processing with respect to the output θ1 of the first data holding circuit 104, at the timing T4 of the reference clock fb. That is, when overflow occurs (θ1>D1), and fb=(High), the overflow prevention circuit 109 outputs the overflow prevention signal fob (=High).

However, in the conventional variable-frequency pulse generator, control for four cycles of the reference clock is necessary during the period of from the speed setting until the overflow prevention processing is completed, that is, during 1 cycle of output control of the pulse train fout. Therefore, the reference clock of a frequency of 8 times or more is required in order to actually obtain the pulse train of a desired frequency (see FIG. 13). As a result, in the conventional variable-frequency pulse generator, with the speed-up of the reference clock, there is caused a problem in that the noise, power consumption and heat generation of the whole apparatus considerably increase.

It is an object of the present invention to provide a variable-frequency pulse generator capable of reducing the noise, power consumption and heat generation compared to the conventional apparatus.

DISCLOSURE OF THE INVENTION

The variable-frequency pulse generator according to the present invention has a configuration such that one cycle of output control of the pulse train is executed by two cycles of the reference clock, and for example, comprises an inversion unit (corresponding to an inverter 11 in the embodiment described later) which inverts a first reference value regulated by the reference clock, a selection unit (corresponding to a data selector 12) which selects the first reference value after inversion, when an overflow has occurred, and in any other event selects a predetermined value which changes depending on a set speed, a data holding unit (corresponding to a first data holding circuit 14) which latches an output of a previous stage, being the present value of a result of addition, in the second cycle of the reference clock and at a predetermined timing of an overflow prevention signal, an addition unit (corresponding to a digital adder 13) which adds the value selected by the selection unit and the data latched by the data holding unit, a first comparison unit (corresponding to a first data comparator 15) which compares the value obtained by the addition unit as a result of addition and the first reference value, a second comparison unit (corresponding to a second data comparator 16) which compares the value obtained by the addition unit as a result of addition and a second reference value which is half of the first reference value, a judgment unit (corresponding to a pulse generation circuit 17) which judges whether a condition "0≦addition result<second reference value" is satisfied, or whether a condition "second reference value≦addition result<first reference value" is satisfied, or whether a condition "first reference value≦addition result" is satisfied, and outputs a specified signal corresponding to a result of the judgment, a pulse train output unit (corresponding to a second data holding circuit 18) which latches the specified signal at a predetermined timing of the second cycle of the reference clock, and outputs a pulse train of a desired frequency, a third comparison unit (corresponding to a third data comparator 19) which compares the data latched by the data holding unit and the first reference value, and when a condition "latched data≧first reference value" is satisfied, judges that the overflow has occurred, and an overflow prevention unit (corresponding to an overflow prevention circuit 20) which outputs the overflow prevention signal at a predetermined timing of the first cycle of the reference clock, when the third comparison unit has judged that the overflow has occurred.

The variable-frequency pulse generator according to the next invention has a configuration such that one cycle of output control of the pulse train is executed by two cycles of the reference clock, and for example, comprises an addition unit (corresponding to a digital adder 21) which adds a predetermined value, which changes depending on a set speed, and data latched at a predetermined timing of the second cycle of the reference clock, a subtraction unit (corresponding to a digital subtracter 22) which subtracts a first reference value regulated by the reference clock from the value obtained by the addition unit as a result of addition, a first comparison unit (corresponding to a first data comparator 25) which compares the value obtained by the addition unit as a result of addition and the first reference value, and when a condition "addition result≧first reference value" is satisfied, judges that an overflow has occurred, a second comparison unit (corresponding to a second data comparator 26) which compares the value obtained by the addition unit as a result of addition and a second reference value which is half of the first reference value, a selection unit (corresponding to a data selector 23) which selects the value obtained by the subtraction unit as a result of subtraction when the overflow has occurred, and in any other event selects the value obtained by the addition unit as a result of addition, a data holding unit (corresponding to a first data holding circuit 24) which latches the value selected by the selection unit at a predetermined timing of the second cycle of the reference clock, a judgment unit (corresponding to a pulse generation circuit 27) which judges based on each the results of comparisons in the first comparison unit and the second comparison unit, whether a condition "0≦addition result<second reference value" is satisfied, or whether a condition "second reference value≦addition result<first reference value" is satisfied, or whether a condition "first reference value≦addition result" is satisfied, and outputs a specified signal according to a result of the judgment, and a pulse train output unit (corresponding to a second data holding circuit 28) which latches the specified signal at a predetermined timing of the second cycle of the reference clock, and outputs a pulse train of a desired frequency.

The variable-frequency pulse generator according to the next invention has a configuration such that one cycle of output control of the pulse train is executed by two cycles of the reference clock, and for example, comprises an inversion unit which inverts a reference value regulated by the reference clock, a selection unit which selects the reference value after inversion, when an overflow has occurred, and in any other event selects a predetermined value which changes depending on a set speed, a data holding unit which latches an output of a previous stage, being the present value of a result of addition, in the second cycle of the reference clock and at a predetermined timing of an overflow prevention signal, an addition unit which adds the value selected by the selection unit and the data latched by the data holding unit, a first comparison unit which compares the value obtained by the addition unit as a result of addition and the reference value, a judgment unit (corresponding to a pulse generation circuit 17c) which judges whether a condition "the overflow frequency is an even number" and "0≦addition result<reference value" is satisfied, or whether a condition "the overflow frequency is an even number" and "reference value≦addition result" is satisfied, or whether conditions "the overflow frequency is an odd number" and "0≦addition result<reference value" are satisfied, or whether conditions "the overflow frequency is an odd number" and "reference value≦addition result" are satisfied, and outputs a specified signal corresponding to a result of the judgment, a pulse train output unit which latches the specified signal at a predetermined timing of the second cycle of the reference clock, and outputs a pulse train of a desired frequency, a second comparison unit which compares the data latched by the data holding unit and the reference value, and when a condition "latched data≧reference value" is satisfied, judges that the overflow has occurred, and an overflow prevention unit which outputs the overflow prevention signal at a predetermined timing of the first cycle of the reference clock, when the second comparison unit has judged that the overflow has occurred.

The variable-frequency pulse generator according to the next invention has a configuration such that one cycle of output control of the pulse train is executed by two cycles of the reference clock, and for example, comprises an inversion unit which inverts a first reference value regulated by the reference clock, a selection unit which selects the first reference value after inversion, when an overflow has occurred, and in any other event selects a predetermined value which changes depending on a set speed, a data holding unit which latches an output of a previous stage, being the present value of a result of addition, in the second cycle of the reference clock and at a predetermined timing of the overflow prevention signal, an addition unit which adds the value selected by the selection unit and the data latched by the data holding unit, a first comparison unit which compares the value obtained by the addition unit as a result of addition and the first reference value, a second comparison unit which compares the value obtained by the addition unit as a result of addition and a second reference value which is half of the first reference value, a judgment unit which judges whether a condition "0≦addition result<second reference value" is satisfied, or whether a condition "second reference value≦addition result<first reference value" is satisfied, or whether a condition "first reference value≦addition result<(second reference value× 3)" is satisfied, or whether a condition "(second reference value×3)≦addition result" is satisfied, and outputs a specified signal corresponding to a result of the judgment, a pulse train output unit which latches the specified signal at a predetermined timing of the second cycle of the reference clock, and outputs a pulse train of a desired frequency, a third comparison unit (corresponding to a third data comparator 19d) which compares the data latched by the data holding unit and the first reference value, and when a condition "latched data>first reference value" is satisfied, judges that the overflow has occurred, and an overflow prevention unit which outputs the overflow prevention signal at a predetermined timing of the first cycle of the reference clock, when the third comparison unit has judged that the overflow has occurred.

BRIEF DESCRIPTION OF THE DRAWINGS

FIG. 2 is a timing chart which shows the operation of the variable-frequency pulse generator in the first embodiment, FIG. 3 shows the output result of each section, when the variable-frequency pulse generator in the first embodiment is operated, FIG. 4 shows the output waveform of the variable-frequency pulse generator in the first embodiment, FIG. 7 shows the output result of each section, when the variable-frequency pulse generator in the second embodiment is operated, FIG. 9 shows the output result of each section, when the variable-frequency pulse generator in the third embodiment is operated, FIG. 11 shows the output result of each section, when the variable-frequency pulse generator in the fourth embodiment is operated, FIG. 13 is a timing chart which shows the operation of the conventional variable-frequency pulse generator.

BEST MODE FOR CARRYING OUT THE INVENTION

Embodiments of the variable-frequency pulse generator according to this invention will be explained in detail below with reference to the accompanying drawings. However, this invention is not limited by these embodiments.

First Embodiment

Figure 1:
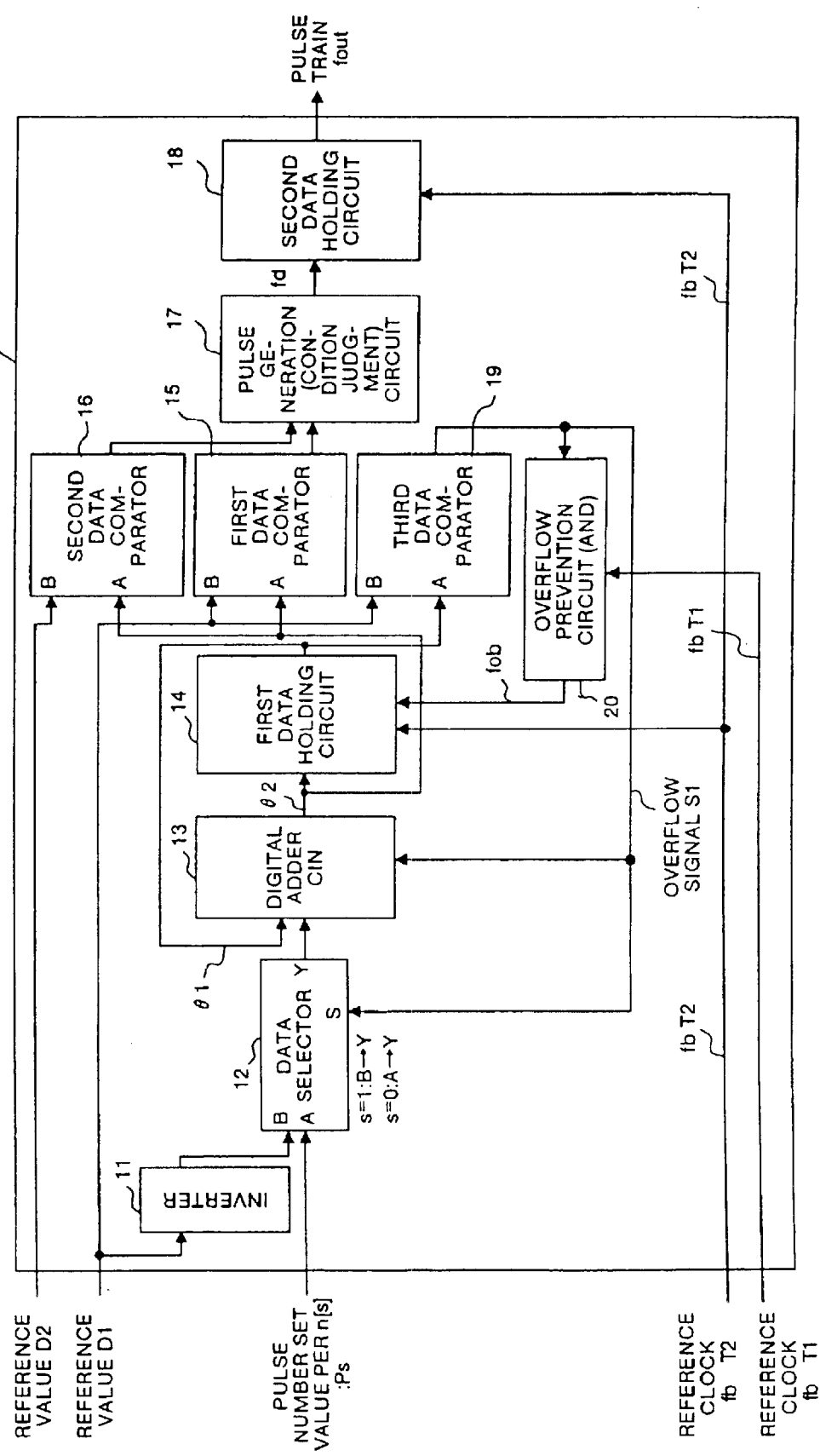
FIG. 1 shows the configuration of a first embodiment of a variable-frequency pulse generator according to the present invention.

FIG. 1 shows the configuration of a first embodiment of the variable-frequency pulse generator according to the present invention. In FIG. 1, the reference symbol 1a denotes a variable-frequency pulse generation circuit in the first embodiment, 11 denotes a bit inverter which inverts a first reference value D1, 12 denotes a data selector which selects either one of the output of the inverter 11 and a pulse number set value Ps, 13 denotes a digital adder which adds the output θ1 of a first data holding circuit 14 described later and the output of the data selector 12, and 14 denotes a first data holding circuit which latches the output θ2 of the digital adder 13 at the timing T2 of a reference clock fb. The reference symbol 15 denotes a first data comparator which compares the output θ2 of the digital adder 13 and the first reference value D1, and 16 denotes a second data comparator which compares the output θ2 of the digital adder 13 and a second reference value D2. The reference symbol 17 denotes a pulse generation circuit which judges the output level (High or Low) based on the two comparison results, 18 denotes a second data holding circuit which latches the output fd of the pulse generation circuit 17 at the timing T2 of the reference clock fb and outputs a pulse train fout, 19 denotes a third data comparator which compares the output θ1 of the first data holding circuit 14 and the first reference value D1, and 20 denotes an overflow prevention circuit which outputs an overflow prevention signal fob based on the comparison result of the third data comparator 19.

In the first embodiment, the control clock frequency fc is [fb/2], and the first reference value D1 is [fc×n], and the second reference value D2 is [(fc/2)×n]. The pulse number set value per n seconds Ps is [Vp×n], and the value thereof can be set per one unit in the range of [0≦Ps≦{(fc/2)×n}]. However, n denotes the maximum cycle of the output pulse, and Vp denotes a speed set value.

In the first embodiment, as one example, explanation is given by assuming that the reference clock frequency fb is 32 MHz, and the maximum cycle n of the output pulse is 2 seconds. In this case, the control clock frequency fc becomes fc=fb/2=32 MHz/2=16 MHz, the first reference value D1 becomes D1=fc×n=16 MHz×2=32 M, the second reference value D2 becomes D2=(fc/2)×n=(16 MHz/2)×2=16 M, and the pulse number set value per n seconds (hereinafter referred to as a "pulse number set value") Ps becomes 0≦Ps≦16 MHz. Therefore, the speed set value Vp becomes 0≦Vp≦8 MHz.

The operation of the variable-frequency pulse generator in the first embodiment will now be explained. The inverter 11 outputs a bit inversion value of the reference value D1 in the 26-bit notation. When the S terminal is 0 (θ1<D1), the data selector 12 outputs the pulse number set value Ps (26-bit notation) of a terminal A to a terminal Y, and when the S terminal is 1 (θ1≧D1), the data selector 12 outputs the bit inversion value of the reference value D1 of a terminal B to the terminal Y.

When the CIN terminal is 0 (θ1<D1), the digital adder 13 adds the pulse number set value Ps output from the data selector 12 and the output θ1 of the first data holding circuit 14, and when the CIN terminal is 1 (θ1≧D1), the digital adder 13 adds –(fc×n), being the sum of the output of the data selector 12 and CIN=1, and the output θ1 of the first data holding circuit 14, and outputs the addition result θ2 (26-bit notation) for each case. The first data holding circuit 14 latches the addition result θ2 at the timing T2 of the reference clock fb and the overflow prevention signal fob, and outputs data θ1 (26-bit notation).

The first data comparator 15 compares the output θ2 of the digital adder 13 and the first reference value D1. The second data comparator 16 compares the output θ2 of the digital adder 13 and the second reference value D2. The pulse generation circuit 17 judges the both comparison results, and for example, when the comparison results by the both comparators are $0 \leq \theta 2 < D2$ (=(fc/2)×n), outputs 0 as the judgment result fd, and when $D2 \leq \theta 2 < D1$ (=fc×n), outputs 1, and when $D1 \leq \theta 2$, outputs 0. The second data holding circuit 18 latches the judgment result fd at the timing T2 of the reference clock fb, and outputs a pulse train fout.

The third data comparator 19 compares the output θ1 of the first data holding circuit 14 and the first reference value D1, and when θ1<D1, outputs 0, and when $\theta 1 \geq D1$, outputs 1. The overflow prevention circuit 20 receives the output of the third data comparator 19 at the timing T1 of the reference clock fb, and outputs an overflow prevention signal fob.

FIG. 2 is a timing chart which shows the operation of the variable-frequency pulse generator in the first embodiment. At first, the speed change timing Δt changes at a period synchronous with the timing T1 of the reference clock fb and the speed change timing, and acceleration and deceleration speed is latched at the timing T1 of the reference clock fb. This operation is executed by the part other than the configuration shown in FIG. 1.

The first data holding circuit 14 latches the output θ2 of the digital adder 103 at the timing T2 of the reference clock fb. The second data holding circuit 18 then latches the output fd of the pulse generation circuit 17, and outputs the pulse train fout.

The overflow prevention circuit 20 performs overflow prevention processing with respect to the output θ1 of the first data holding circuit 14, at the timing T1 of the reference clock fb. That is, when overflow occurs ($\theta 1 \geq D1$, and fb=High), the overflow prevention circuit 20 outputs the overflow prevention signal fob (=High). In the first embodiment, the above processing is repetitively executed at timings T1 and T2 of the reference clock fb.

FIG. 3 shows the output result of each section, when the variable-frequency pulse generator in the first embodiment is operated. Here, it is assumed that the reference clock fb is 32 MHz, the maximum cycle n of the output pulse is 2 seconds, and the pulse number set value Ps is 8→16 MHz (that is, the speed set value Vp is set to 4→8 MHz). Therefore, the control clock frequency fc becomes 16 MHz, the first reference value D1 becomes 32 M, and the second reference value D2 becomes 16 M.

In FIG. 3, for example, at the point of time when the elapsed time is 0 second (initial state: 0/32 MHz), either of the pulse number set value Ps (Vp×n), the output value θ1 of the first data holding circuit 14, the overflow signal, the output value θ2 of the digital adder 13, the value fd, and the value fout is 0 (initial value).

When the elapsed time is 1/32 MHz (at the timing T1 of fb), the pulse number set value Ps is Vp×n=4 MHz×2=8 MHz, and the first data holding circuit 14 holds the previous (elapsed time=0 second) output value θ1 (=0). The third data comparator 19 outputs 0 (θ1<D1) as the overflow signal. The output value θ2 of the digital adder 13 is θ2=θ1+Ps=0+8 MHz=8 MHz, since the overflow signal is 0. The output value fd of the pulse generation circuit 17 is fd=0, since $0 \leq \theta 2 < D2$, and the output value fout of the second data holding circuit 18 holds the previous fout value, and fout=0.

When the elapsed time is 2/32 MHz (at the timing T2 of fb), the pulse number set value Ps is Vp×n=8 MHz similar to the previous elapsed time, and the first data holding circuit 14 latches the output value θ2 immediately before (elapsed time=1/32 MHz) and the output value θ1 thereof becomes θ1=8 MHz. The third data comparator 19 outputs 0 (θ1<D1) as the overflow signal. The output value θ2 of the digital adder 13 is θ2=θ1+Ps=8 MHz+8 MHz=16 MHz, since the overflow signal is 0. The output value fd of the pulse generation circuit 17 is fd=1, since $D2 \leq \theta 2 < D1$, and the second data holding circuit 18 latches the value fd (=0) immediately before and the output value fout thereof becomes fout=0.

When the elapsed time is 3/32 MHz (at the timing T1 of fb), the pulse number set value Ps is Vp×n=8 MHz similar to the previous elapsed time, and the first data holding circuit 14 holds the previous (elapsed time=2/32 MHz) output value θ1 (=8 MHz). The third data comparator 19 outputs 0 (θ1<D1) as the overflow signal. The output value θ2 of the digital adder 13 is θ2=θ1+Ps=8 MHz+8 MHz=16 MHz, since the overflow signal is 0. The output value fd of the pulse generation circuit 17 is fd=1, since $D2 \leq \theta 2 < D1$, and the second data holding circuit 18 holds the previous value fout (=0) and the output value fout thereof becomes fout=0.

When the elapsed time is 4/32 MHz (at the timing T2 of fb), the pulse number set value Ps is Vp×n=8 MHz similar to the previous elapsed time, and the first data holding circuit 14 latches the output value θ2 immediately before (elapsed time=3/32 MHz) and the output value θ1 thereof becomes θ1=16 MHz. The third data comparator 19 outputs 0 (θ1<D1) as the overflow signal. The output value θ2 of the digital adder 13 is θ2=θ1+Ps=16 MHz+8 MHz=24 MHz, since the overflow signal is 0. The output value fd of the pulse generation circuit 17 is fd=1, since $D2 \leq \theta 2 < D1$, and the second data holding circuit 18 latches the value fd (=1) immediately before and the output value fout thereof becomes fout=1.

When the elapsed time is 5/32 MHz (at the timing T1 of fb), the pulse number set value Ps is Vp×n=8 MHz similar to the previous elapsed time, and the first data holding circuit 14 holds the previous (elapsed time=4/32 MHz) output value θ1 (=16 MHz). The third data comparator 19 outputs 0 (θ1<D1) as the overflow signal. The output value θ2 of the digital adder 13 is θ2=θ1+Ps=16 MHz+8 MHz=24 MHz, since the overflow signal is 0. The output value fd of the pulse generation circuit 17 is fd=1, since $D2 \leq \theta 2 < D1$, and the second data holding circuit 18 holds the previous value fout (=1) and the output value fout thereof becomes fout=1.

When the elapsed time is 6/32 MHz (at the timing T2 of fb), the pulse number set value Ps is Vp×n=8 MHz similar to the previous elapsed time, and the first data holding circuit 14 latches the output value θ2 immediately before (elapsed time=5/32 MHz) and the output value θ1 thereof becomes θ1=24 MHz. The third data comparator 19 outputs 0 (θ1<D1) as the overflow signal. The output value θ2 of the digital adder 13 is θ2=θ1+Ps=24 MHz+8 MHz=32 MHz, since the overflow signal is 0. The output value fd of the pulse generation circuit 17 is fd=0, since $D1 \leq \theta 2$, and the second data holding circuit 18 latches the value fd (=1) immediately before and the output value fout thereof becomes fout=1.

When the elapsed time is 7/32 MHz (at the timing T1 of fb), the pulse number set value Ps is Vp×n=8 MHz similar to the previous elapsed time, and the first data holding circuit 14 holds the previous (elapsed time=6/32 MHz) output value θ1 (=24 MHz). The third data comparator 19 outputs 0 (θ1<D1) as the overflow signal. The output value θ2 of the digital adder 13 is θ2=θ1+Ps=24 MHz+8 MHz=32 MHz, since the overflow signal is 0. The output value fd of the pulse generation circuit 17 is fd=0, since $D2 \leq \theta 2$, and the second data holding circuit 18 holds the previous value fout (=1) and the output value fout thereof becomes fout=1.

When the elapsed time is 8/32 MHz (at the timing T2 of fb), the pulse number set value Ps is Vp×n=8 MHz similar to the previous elapsed time, and the first data holding circuit 14 latches the output value θ2 immediately before (elapsed time=7/32 MHz) and the output value θ1 thereof becomes θ1=32 MHz. The third data comparator 19 outputs 1 (θ1≧D1) as the overflow signal. The output value θ2 of the digital adder 13 is θ2=θ1−D1=32 MHz−32 MHz=0 MHz, since the overflow signal is 1. The output value fd of the pulse generation circuit 17 is fd=0, since 0≦θ2<D2, and the second data holding circuit 18 latches the value fd (=0) immediately before and the output value fout thereof becomes fout=0.

When the elapsed time is 9/32 MHz (at the timing T1 of fb), the pulse number set value Ps is changed to Vp×n=16 MHz, and the first data holding circuit 14 latches the output value θ2 immediately before (elapsed time=8/32 MHz), and the output value θ1 thereof becomes θ1=0 MHz. The third data comparator 19 outputs 0 (θ1<D1) as the overflow signal. The output value θ2 of the digital adder 13 is θ2=θ1+Ps=0 MHz+16 MHz=16 MHz, since the overflow signal is 0. The output value fd of the pulse generation circuit 17 is fd=1, since D2≦θ2<D1, and the second data holding circuit 18 holds the previous value fout (=0) and the output value fout thereof becomes fout=0.

When the elapsed time is 10/32 MHz (at the timing T2 of fb), the pulse number set value Ps is Vp×n=16 MHz similar to the previous elapsed time, and the first data holding circuit 14 latches the output value θ2 immediately before (elapsed time=9/32 MHz) and the output value θ1 thereof becomes θ1=16 MHz. The third data comparator 19 outputs 0 (θ1<D1) as the overflow signal. The output value θ2 of the digital adder 13 is θ2=θ1+Ps=16 MHz+16 MHz=32 MHz, since the overflow signal is 0. The output value fd of the pulse generation circuit 17 is fd=1, since D2≦θ2<D1, and the second data holding circuit 18 latches the value fd (=1) immediately before and the output value fout thereof becomes fout=1.

Hereinafter, the similar operation is performed for the elapsed time 11/32 MHz and the elapsed time 12/32 MHz, . . . , and the output as shown in FIG. 3 can be obtained.

FIG. 4 shows the output waveform of the variable-frequency pulse generator in the first embodiment. In the variable-frequency pulse generator, during the elapsed time of from 0 to 8 [unit of 31.25 ns], that is, during 31.25×8=250 ns, the speed set value is Vp=4 MHz, and the output pulse fout becomes also 4 MHz, and it is seen that the pulse is output as per the speed set value Vp. On the other hand, during the elapsed time of from 8 to 16 [unit of 31.25 ns], that is, during 31.25×8=250 ns, the speed set value is Vp=8 MHz, and the output pulse fout becomes also 8 MHz, and it is also seen that the pulse is output as per the speed set value Vp. In this manner, in the variable-frequency pulse generator in the first embodiment, the output pulse changes corresponding to the change in the speed set value.

As described above, in the first embodiment, one cycle of the output control of the pulse train fout is changed from four cycles (T1–T4) to two cycles (T1–T2) of the reference clock, by comparing the output θ2 of the digital adder 13 before being held by the first data holding circuit 14, and the first reference value D1 and the second reference value D2, respectively, by the first data comparator 15 and the second data comparator 16. The latch timing of the overflow signal is also changed from T4 to T1 of the reference clock fb, by comparing the output θ1 of the first data holding circuit 14 and the first reference value D1 by the third data comparator 19. Thereby, the control cycle can be reduced, and the noise, power consumption and heat generation can be reduced, compared to the conventional art.

Second Embodiment

Figure 5:
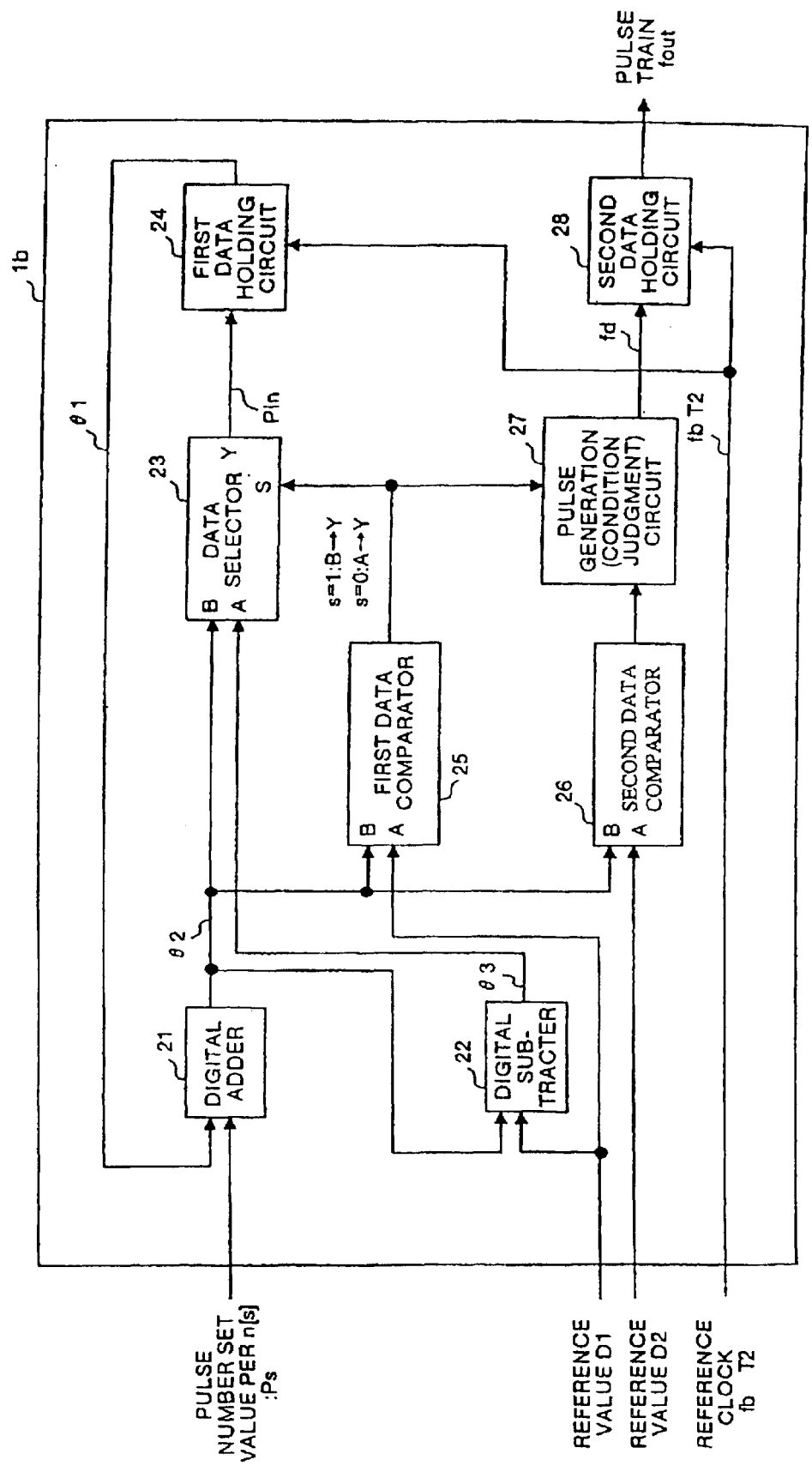
FIG. 5 shows the configuration of a second embodiment of the variable-frequency pulse generator according to the present invention.

FIG. 5 shows the configuration of a second embodiment of the variable-frequency pulse generator according to the present invention. In FIG. 5, the reference symbol 1b denotes a variable-frequency pulse generation circuit in the second embodiment, 21 denotes a digital adder which adds the output θ1 of a first data holding circuit 24 described later and the pulse number set value Ps, and 22 denotes a digital subtracter which subtracts a first reference value D1 from the output θ2 of the digital adder 21. The reference symbol 23 denotes a data selector which selects either one of the output of the output θ2 of the digital adder 21 and the output θ3 of the digital subtracter 22, 24 denotes a first data holding circuit which latches the output of the data selector 23 at the timing T2 of the reference clock fb, 25 denotes a first data comparator which compares the output θ2 of the digital adder 21 and the first reference value D1, and 26 denotes a second data comparator which compares the output θ2 of the digital adder 21 and the second reference value D2. The reference symbol 27 denotes a pulse generation circuit which judges the output level (High or Low) based on the two comparison results, and 28 denotes a second data holding circuit which latches the output fd of the pulse generation circuit 27 at the timing T2 of the reference clock fb and outputs a pulse train fout.

In the second embodiment, the control clock frequency fc is [fb/2]. The first reference value D1 is [fc×n], and the second reference value D2 is [(fc/2)×n]. The pulse number set value per n seconds Ps is [Vp×n], and the value thereof can be set per one unit in the range of [0≦Ps≦{(fc/2)×n}]. n denotes the maximum cycle of the output pulse, and Vp denotes a speed set value.

In the second embodiment, as one example, explanation is given by assuming that the reference clock frequency fb is 32 MHz, and the maximum cycle n of the output pulse is 2 seconds. In this case, the control clock frequency fc becomes fc=fb/2=32 MHz/2=16 MHz, the first reference value D1 becomes D1=fc×n=16 MHz×2=32 M, the second reference value D2 becomes D2=(fc/2)×n=(16 MHz/2)×2=16 M, and the pulse number set value per n seconds (hereinafter referred to as a "pulse number set value") Ps becomes 0≦Ps≦16 MHz. Therefore, the speed set value Vp becomes 0≦Vp≦8 MHz.

The operation of the variable-frequency pulse generator in the second embodiment will now be explained. The digital adder 21 adds the pulse number set value Ps (26-bit notation) and the output θ1 of the first data holding circuit 24 (26-bit notation), and outputs the addition result θ2 (26-bit notation). However, 0≦θ2<((fc/2)×n+fc×n). The digital subtracter 22 subtracts the first reference value D1 from the output θ2 of the digital adder 21, and outputs the subtraction result θ3 (26-bit notation) However, −(fc×n)≦θ3<((fc/2)×n).

When the S terminal is 1 (θ2<D1), the data selector 23 outputs the data θ2 of the terminal B to the terminal Y, and when the S terminal is 0 (θ2≧D1), the data selector 23 outputs the data θ3 of the terminal A to the terminal Y. The first data holding circuit 24 latches the output of the data selector 23 at the timing T2 of the reference clock fb, and outputs data θ1 (26-bit notation). However, 0≦θ1<(fc×n).

The first data comparator 25 compares the output θ2 of the digital adder 21 and the first reference value D1. The second data comparator 26 compares the output θ2 of the digital adder 13 and the second reference value D2. The pulse generation circuit 27 judges the both comparison results, and for example, when the comparison results by the both comparators are $0 \leq \theta2 < D2$ (=(fc/2)×n), outputs 0 as the judgment result fd, and when $D2 \leq \theta2 < D1$ (=fc×n), outputs 1, and when $D1 \leq \theta2$, outputs 0. The second data holding circuit 28 latches the judgment result fd at the timing T2 of the reference clock fb, and outputs a pulse train fout.

Figure 6:
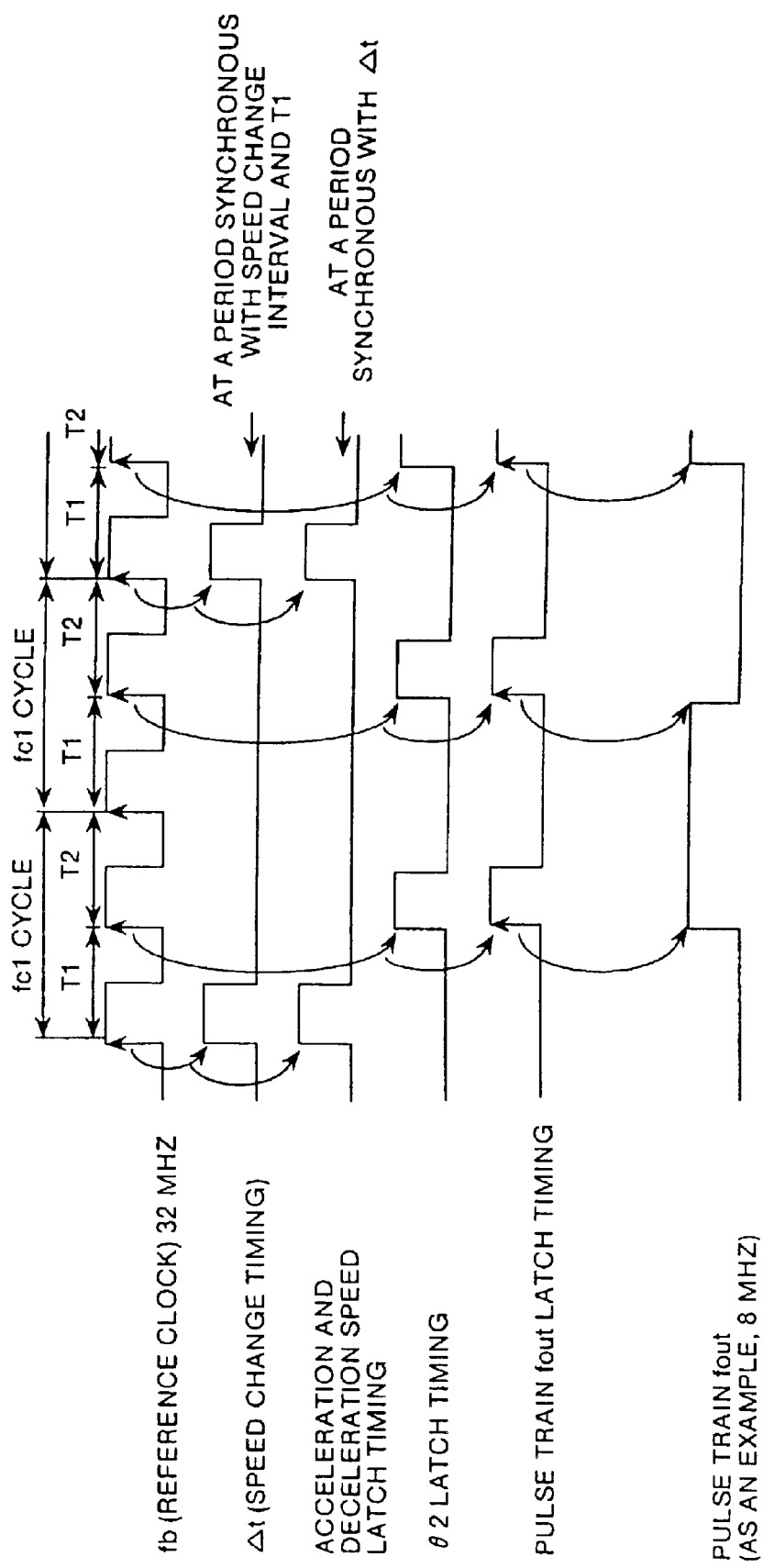
FIG. 6 is a timing chart which shows the operation of the variable-frequency pulse generator in the second embodiment.

FIG. 6 is a timing chart which shows the operation of the variable-frequency pulse generator in the second embodiment. At first, the speed change timing Δt changes at a period synchronous with the timing T1 of the reference clock fb and the speed change timing, and acceleration and deceleration speed is latched at the timing T1 of the reference clock fb. This operation is executed by the part other than the configuration shown in FIG. 5.

The first data holding circuit 24 latches the output of the data selector 23 at the timing T2 of the reference clock fb. The second data holding circuit 28 then latches the output fd of the pulse generation circuit 27, and outputs the pulse train fout.

FIG. 7 shows the output result of each section, when the variable-frequency pulse generator in the second embodiment is operated. Here, it is assumed that the reference clock fb is 32 MHz, the maximum cycle n of the output pulse is 2 seconds, and the pulse number set value Ps is 8→16 MHz (that is, the speed set value Vp is set to 4→8 MHz). Therefore, the control clock frequency fc becomes 16 MHz, the first reference value D1 becomes 32 M, and the second reference value D2 becomes 16 M.

In FIG. 7, for example, at the point of time when the elapsed time is 0 second (initial state: 0/32 MHz), either of the pulse number set value Ps (Vp×n), the output value θ1 of the first data holding circuit 24, the output value θ2 of the digital adder 21, the output value θ3 of the digital subtracter 22, the value of Pin, the value fd, and the value fout is 0 (initial value).

When the elapsed time is 1/32 MHz (at the timing T1 of fb), the pulse number set value Ps is Vp×n=4 MHz×2=8 MHz, and the first data holding circuit 24 holds the previous (elapsed time=0 second) output value θ1 (=0) The output value θ2 of the digital adder 21 is θ2=θ1+Ps=0+8 MHz=8 MHz, and output value θ3 of the digital subtracter 22 is θ3=θ2−D1=8 MHz−32 MHz=−24 MHz. At this time, the output Pin of the data selector 23 becomes θ2. The output value fd of the pulse generation circuit 27 is fd=0, since $0 \leq \theta2 < D2$, and the output value fout of the second data holding circuit 28 holds the previous fout value, and fout=0.

When the elapsed time is 2/32 MHz (at the timing T2 of fb), the pulse number set value Ps is Vp×n=8 MHz similar to the previous elapsed time, and the first data holding circuit 24 latches the output value Pin=θ2 immediately before (elapsed time=1/32 MHz) and the output value θ1 thereof becomes θ1=8 MHz. The output value θ2 of the digital adder 21 is θ2=θ1+Ps=8 MHz+8 MHz=16 MHz, and the output value θ3 of the digital subtracter 22 is θ3=θ2−D1=16 MHz−32 MHz=−16 MHz. At this time, the output Pin of the data selector 23 becomes θ2. The output value fd of the pulse generation circuit 27 is fd=1, since $D2 \leq \theta2 < D1$, and the second data holding circuit 28 latches the value fd (=0) immediately before and the output value fout thereof becomes fout=0.

When the elapsed time is 3/32 MHz (at the timing T1 of fb), the pulse number set value Ps is Vp×n=4 MHz×2=8 MHz, and the first data holding circuit 24 holds the previous (elapsed time=2/32 MHz) output value θ1 (=8 MHz). The output value θ2 of the digital adder 21 is θ2=θ1+Ps=8 MHz+8 MHz=16 MHz, and the output value θ3 of the digital subtracter 22 is θ3=θ2−D1=16 MHz−32 MHz=−16 MHz. At this time, the output Pin of the data selector 23 becomes θ2. The output value fd of the pulse generation circuit 27 is fd=1, since $D2 \leq \theta2 < D1$, and the second data holding circuit 28 holds the previous value fout and the output value fout thereof becomes fout=0.

When the elapsed time is 4/32 MHz (at the timing T2 of fb), the pulse number set value Ps is Vp×n=8 MHz similar to the previous elapsed time, and the first data holding circuit 24 latches the output value Pin=θ2 immediately before (elapsed time=3/32 MHz) and the output value θ1 thereof becomes θ1=16 MHz. The output value θ2 of the digital adder 21 is θ2=θ1+Ps=16 MHz+8 MHz=24 MHz, and the output value θ3 of the digital subtracter 22 is θ3=θ2−D1=24 MHz−32 MHz=−8 MHz. At this time, the output Pin of the data selector 23 becomes θ2. The output value fd of the pulse generation circuit 27 is fd=1, since $D2 \leq \theta2 < D1$, and the second data holding circuit 28 latches the value fd (=1) immediately before and the output value fout thereof becomes fout=1.

When the elapsed time is 5/32 MHz (at the timing T1 of fb), the pulse number set value Ps is Vp×n=4 MHz×2=8 MHz, and the first data holding circuit 24 holds the previous (elapsed time=4/32 MHz) output value θ1 (=16 MHz). The output value θ2 of the digital adder 21 is θ2=θ1+Ps=16 MHz+8 MHz=24 MHz, and the output value θ3 of the digital subtracter 22 is θ3=θ2−D1=24 MHz−32 MHz=−8 MHz. At this time, the output Pin of the data selector 23 becomes θ2. The output value fd of the pulse generation circuit 27 is fd=1, since $D2 \leq \theta2 < D1$, and the second data holding circuit 28 holds the previous value fout and the output value fout thereof becomes fout=1.

When the elapsed time is 6/32 MHz (at the timing T2 of fb), the pulse number set value Ps is Vp×n=8 MHz similar to the previous elapsed time, and the first data holding circuit 24 latches the output value Pin=θ2 immediately before (elapsed time=5/32 MHz) and the output value θ1 thereof becomes θ1=24 MHz. The output value θ2 of the digital adder 21 is θ2=θ1+Ps=24 MHz+8 MHz=32 MHz, and the output value θ3 of the digital subtracter 22 is θ3=θ2−D1=32 MHz−32 MHz=0 MHz. At this time, the output Pin of the data selector 23 becomes θ3. The output value fd of the pulse generation circuit 27 is fd=0, since $D1 \leq \theta2$, and the second data holding circuit 28 latches the value fd (=1) immediately before and the output value fout thereof becomes fout=1.

When the elapsed time is 7/32 MHz (at the timing T1 of fb), the pulse number set value Ps is Vp×n=4 MHz×2=8 MHz, and the first data holding circuit 24 holds the previous (elapsed time=6/32 MHz) output value θ1 (=24 MHz). The output value θ2 of the digital adder 21 is θ2=θ1+Ps=24 MHz+8 MHz=32 MHz, and the output value θ3 of the digital subtracter 22 is θ3=θ2−D1=32 MHz−32 MHz=0 MHz. At this time, the output Pin of the data selector 23 becomes θ3. The output value fd of the pulse generation circuit 27 is fd=0, since $D2 < \theta2$, and the second data holding circuit 28 holds the previous value fout and the output value fout thereof becomes fout=1.

When the elapsed time is 8/32 MHz (at the timing T2 of fb), the pulse number set value Ps is Vp×n=8 MHz similar to the previous elapsed time, and the first data holding circuit 24 latches the output value Pin=θ3 immediately before (elapsed time=7/32 MHz) and the output value θ1 thereof becomes θ1=0 MHz. The output value θ2 of the digital adder 21 is θ2=θ1+Ps=0 MHz+8 MHz=8 MHz, and the output value θ3 of the digital subtracter 22 is θ3=θ2−D1=8 MHz−32 MHz=−24 MHz. At this time, the output Pin of the data selector 23 becomes θ2. The output value fd of the pulse generation circuit 27 is fd=0, since $0 \leq \theta2 < D2$, and the second data holding circuit 28 latches the value fd (=0) immediately before and the output value fout thereof becomes fout=0.

When the elapsed time is 9/32 MHz (at the timing T1 of fb), the pulse number set value Ps is changed to Vp×n=16 MHz, and the first data holding circuit 24 holds the previous (elapsed time=8/32 MHz) output value θ1 (=0 MHz). The output value θ2 of the digital adder 21 is θ2=θ1+Ps=0 MHz+16 MHz=16 MHz, and the output value θ3 of the digital subtracter 22 is θ3=θ2−D1=16 MHz−32 MHz=−16 MHz. At this time, the output Pin of the data selector 23 becomes θ2. The output value fd of the pulse generation circuit 27 is fd=1, since D2≦θ2<D1, and the second data holding circuit 28 holds the previous value fout and the output value fout thereof becomes fout=0.

When the elapsed time is 10/32 MHz (at the timing T2 of fb), the pulse number set value Ps is Vp×n=16 MHz similar to the previous elapsed time, and the first data holding circuit 24 latches the output value Pin=θ2 immediately before (elapsed time=9/32 MHz) and the output value θ1 thereof becomes θ1=16 MHz. The output value θ2 of the digital adder 21 is θ2=θ1+Ps=16 MHz+16 MHz=32 MHz, and the output value θ3 of the digital subtracter 22 is θ3=θ2−D1=32 MHz−32 MHz=0 MHz. At this time, the output Pin of the data selector 23 becomes θ3. The output value fd of the pulse generation circuit 27 is fd=0, since D1<θ2, and the second data holding circuit 28 latches the value fd (=1) immediately before and the output value fout thereof becomes fout=1.

Hereinafter, similar operation is performed for the elapsed time 11/32 MHz and the elapsed time 12/32 MHz, . . . , and the output as shown in FIG. 7 can be obtained. The output waveform of the variable-frequency pulse generator in the second embodiment changes corresponding to the change in the speed set value, as in FIG. 4 explained above.

As described above, in the second embodiment, one cycle of the output control of the pulse train fout is changed from four cycles (T1–T4) to two cycles (T1–T2) of the reference clock, by comparing the output θ2 of the digital adder 21 before being held by the first data holding circuit 24, and the first reference value D1 and the second reference value D2, respectively, by the first data comparator 25 and the second data comparator 26. The digital subtracter 22 further subtracts the first reference value D1 from the output θ2 of the digital adder 21, and when the comparison result by the first data comparator 25 satisfies θ2≧D1, the data selector 23 selects and outputs θ3, being the subtraction result, to thereby prevent the overflow of the digital adder 21. Thereby, the control cycle can be reduced, and the noise, power consumption and heat generation can be reduced, compared to the conventional art.

Third Embodiment

Figure 8:
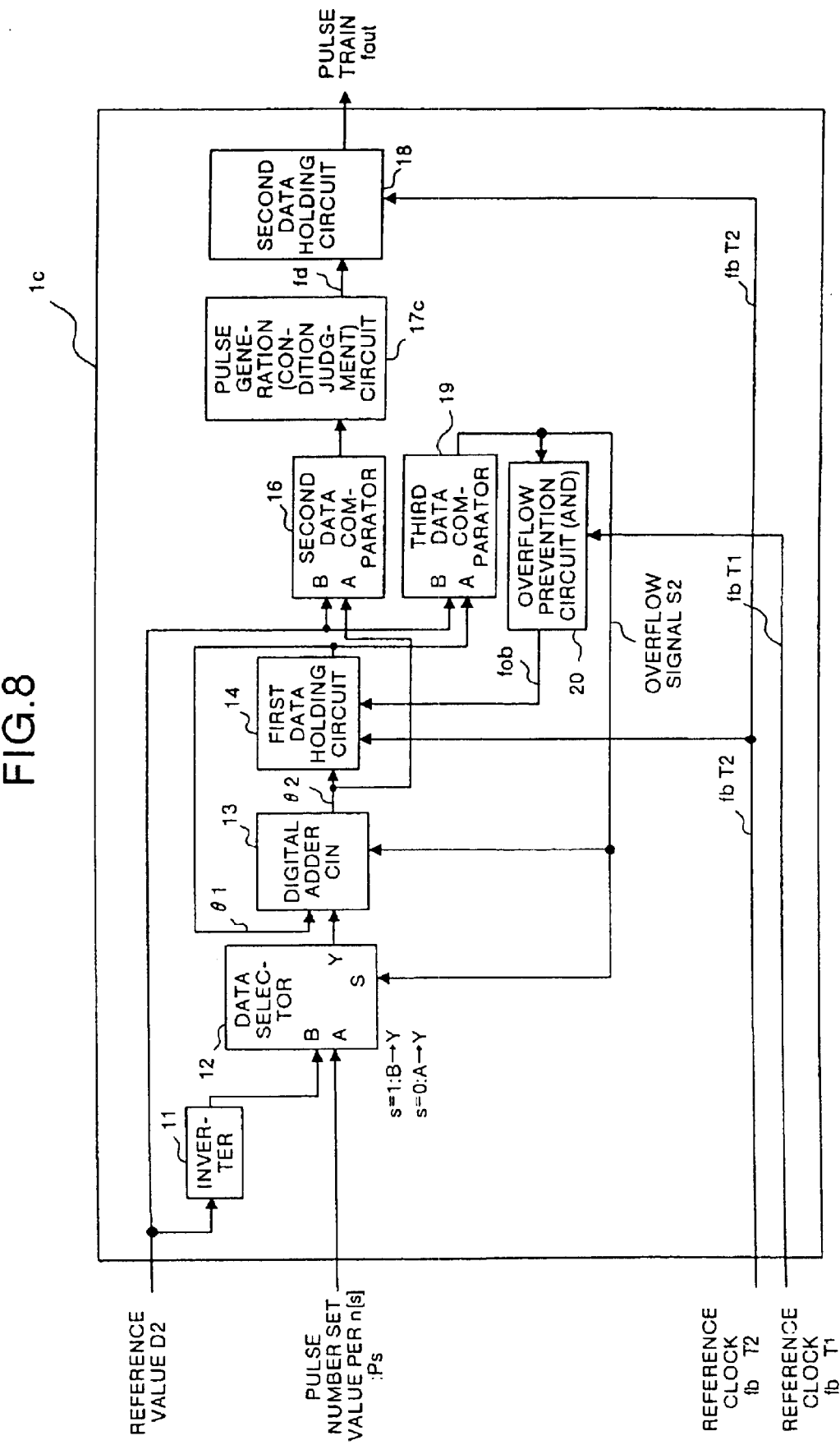
FIG. 8 shows the configuration of a third embodiment of the variable-frequency pulse generator according to the present invention.

FIG. 8 shows the configuration of a third embodiment of the variable-frequency pulse generator according to the present invention. The same configuration as that of the first embodiment described above is denoted by the same reference symbol, and the explanation thereof is omitted. Only the operation different from that of the first embodiment will be explained herein.

In FIG. 8, the reference symbol 1c is a variable-frequency pulse generation circuit in the third embodiment, and 17c is a pulse generation circuit which judges the output level (High or Low) based on the comparison result of the second data comparator 16. As in the first embodiment, the control clock frequency fc is [fb/2], and the second reference value D2 is [(fc/2)×n]. In the second embodiment, as one example, explanation is given by assuming that the reference clock frequency fb is 32 MHz, and the maximum cycle n of the output pulse is 2 seconds.

The operation of the variable-frequency pulse generator in the third embodiment will be explained. The inverter 11 outputs a bit inversion value of the reference value D2 in the 25-bit notation. When the S terminal is 0 (θ1<D1), the data selector 12 outputs the pulse number set value Ps (25-bit notation) of the terminal A to the terminal Y, and when the S terminal is 1 (θ1≧D2), the data selector 12 outputs the bit inversion value of the reference value D2 of the terminal B to the terminal Y.

When the CIN terminal is 0 (θ1<D2), the digital adder 13 adds the pulse number set value Ps output from the data selector 12 and the output θ1 of the first data holding circuit 14, and when the CIN terminal is 1 (θ1≧D2), the digital adder 13 adds −(fc/2×n), being the sum of the output of the data selector 12 and CIN=1, and the output θ1 of the first data holding circuit 14, and outputs the addition result θ2 (25-bit notation) for each case. The first data holding circuit 14 latches the addition result θ2 at the timing T2 of the reference clock fb and the overflow prevention signal fob, and outputs data θ1 (25-bit notation).

The second data comparator 16 compares the output θ2 of the digital adder 13 and the second reference value D2. The pulse generation circuit 17c judges the comparison result of the second data comparator 16, and for example, when the comparison result is 0≦θ2<D2 (=(fc/2)×n) and the overflow is even number of times, outputs 0 as the judgment result fd, and when D2≦θ2 and the overflow is even number of times, outputs 1, and when 0≦θ2<D2 (=(fc/2)×n) and the overflow is odd number of times, outputs 1, and when D2≦θ2 and the overflow is odd number of times, outputs 0. The second data holding circuit 18 latches the judgment result fd at the timing T2 of the reference clock fb, and outputs a pulse train fout.

The third data comparator 19 compares the output θ1 of the first data holding circuit 14 and the second reference value D2, and when θ1<D2, outputs 0, and when θ1≧D2, outputs 1. The overflow prevention circuit 20 receives the output of the third data comparator 19 at the timing T1 of the reference clock fb, and outputs an overflow prevention signal fob.

The latch timing of the variable-frequency pulse generator in the third embodiment is the same as that shown in FIG. 2 explained above, and hence the explanation thereof is omitted.

FIG. 9 shows the output result of each section, when the variable-frequency pulse generator in the third embodiment is operated. It is assumed that the reference clock fb is 32 MHz, the maximum cycle n of the output pulse is 2 seconds, and the pulse number set value Ps is 8→16 MHz (that is, the speed set value Vp is set to 4→8 MHz). Therefore, the control clock frequency fc becomes 16 MHz, and the second reference value D2 becomes 16 M.

In FIG. 9, for example, at the point of time when the elapsed time is 0 second (initial state: 0/32 MHz), either of the pulse number set value Ps (Vp×n), the output value θ1 of the first data holding circuit 14, the overflow signal, the output value θ2 of the digital adder 13, the value fd, and the value fout is 0 (initial value).

When the elapsed time is 1/32 MHz (at the timing T1 of fb), the pulse number set value Ps is Vp×n=4 MHz×2=8 MHz, and the first data holding circuit 14 holds the previous (elapsed time=0 second) output value θ1 (=0). The third data comparator 19 outputs 0 (θ1<D2) as the overflow signal. The output value θ2 of the digital adder 13 is θ2=θ1+Ps=0+8 MHz=8 MHz, since the overflow signal is 0. The output value fd of the pulse generation circuit 17c is fd=0, since the overflow frequency is 0 (0 is designated as an even number) 0≦θ2<D2, and the output value fout of the second data holding circuit 18 holds the previous fout value, and fout=0.

When the elapsed time is 2/32 MHz (at the timing T2 of fb), the pulse number set value Ps is Vp×n=8 MHz similar to the previous elapsed time, and the first data holding circuit 14 latches the output value θ2 immediately before (elapsed time=1/32 MHz) and the output value θ1 thereof becomes θ1=8 MHz. The third data comparator 19 outputs 0 (θ1<D2) as the overflow signal. The output value θ2 of the digital adder 13 is θ2=θ1+Ps=8 MHz+8 MHz=16 MHz, since the overflow signal is 0. The output value fd of the pulse generation circuit 17c is fd=1, since the overflow frequency is 0 and D2≦θ2, and the second data holding circuit 18 latches the value fd (=0) immediately before and the output value fout thereof becomes fout=0.

When the elapsed time is 3/32 MHz (at the timing T1 of fb), the pulse number set value Ps is Vp×n=8 MHz similar to the previous elapsed time, and the first data holding circuit 14 holds the previous (elapsed time=2/32 MHz) output value θ1 (=8 MHz). The third data comparator 19 outputs 0 (θ1<D2) as the overflow signal. The output value θ2 of the digital adder 13 is θ2=θ1+Ps=8 MHz+8 MHz=16 MHz, since the overflow signal is 0. The output value fd of the pulse generation circuit 17c is fd=1, since the overflow frequency is 0 and D2<θ2, and the second data holding circuit 18 holds the previous value fout (=0) and the output value fout thereof becomes fout=0.

When the elapsed time is 4/32 MHz (at the timing T2 of fb), the pulse number set value Ps is Vp×n=8 MHz similar to the previous elapsed time, and the first data holding circuit 14 latches the output value θ2 immediately before (elapsed time=3/32 MHz) and the output value θ1 thereof becomes θ1=16 MHz. The third data comparator 19 outputs 1 (θ1≧D2) as the overflow signal. The output value θ2 of the digital adder 13 is θ2=θ1−D2=16 MHz−16 MHz=0 MHz, since the overflow signal is 1. The output value fd of the pulse generation circuit 17c is fd=1, since the overflow frequency is 1 and 0≦θ2<D2, and the second data holding circuit 18 latches the value fd (=1) immediately before and the output value fout thereof becomes fout=1.

When the elapsed time is 5/32 MHz (at the timing T1 of fb), the pulse number set value Ps is Vp×n=8 MHz similar to the previous elapsed time, and the first data holding circuit 14 latches the output value θ2 immediately before (elapsed time=4/32 MHz) and the output value θ1 thereof becomes θ1=0 MHz. The third data comparator 19 outputs 0 (θ1<D2) as the overflow signal. The output value θ2 of the digital adder 13 is θ2=θ1+Ps=0 MHz+8 MHz=8 MHz, since the overflow signal is 0. The output value fd of the pulse generation circuit 17c is fd=1, since the overflow frequency is 1 and 0≦θ2<D2, and the second data holding circuit 18 holds the previous value fout (=1) and the output value fout thereof becomes fout=1.

When the elapsed time is 6/32 MHz (at the timing T2 of fb), the pulse number set value Ps is Vp×n=8 MHz similar to the previous elapsed time, and the first data holding circuit 14 latches the output value θ2 immediately before (elapsed time=5/32 MHz) and the output value θ1 thereof becomes θ1=8 MHz. The third data comparator 19 outputs 0 (θ1<D2) as the overflow signal. The output value θ2 of the digital adder 13 is θ2=θ1+Ps=8 MHz+8 MHz=16 MHz, since the overflow signal is 0. The output value fd of the pulse generation circuit 17c is fd=0, since the overflow frequency is 1 and D2≦θ2, and the second data holding circuit 18 latches the value fd (=1) immediately before and the output value fout thereof becomes fout=1.

When the elapsed time is 7/32 MHz (at the timing T1 of fb), the pulse number set value Ps is Vp×n=8 MHz similar to the previous elapsed time, and the first data holding circuit 14 holds the previous (elapsed time=6/32 MHz) output value θ1 (=8 MHz). The third data comparator 19 outputs 0 (θ1<D2) as the overflow signal. The output value θ2 of the digital adder 13 is θ2=θ1+Ps=8 MHz+8 MHz=16 MHz, since the overflow signal is 0. The output value fd of the pulse generation circuit 17c is fd=0, since the overflow frequency is 1 and D2≦θ2, and the second data holding circuit 18 holds the previous value fout (=1) and the output value fout thereof becomes fout=1.

When the elapsed time is 8/32 MHz (at the timing T2 of fb), the pulse number set value Ps is Vp×n=8 MHz similar to the previous elapsed time, and the first data holding circuit 14 latches the output value θ2 immediately before (elapsed time=7/32 MHz) and the output value θ1 thereof becomes θ1=16 MHz. The third data comparator 19 outputs 1 (θ1≧D2) as the overflow signal. The output value θ2 of the digital adder 13 is θ2=θ1−D2=16 MHz−16 MHz=0 MHz, since the overflow signal is 1. The output value fd of the pulse generation circuit 17c is fd=0, since the overflow frequency is 2 and 0≦θ2<D2, and the second data holding circuit 18 latches the value fd (=0) immediately before and the output value fout thereof becomes fout=0.

When the elapsed time is 9/32 MHz (at the timing T1 of fb), the pulse number set value Ps is changed to Vp×n=16 MHz, and the first data holding circuit 14 latches the output value θ2 immediately before (elapsed time=8/32 MHz) and the output value θ1 becomes θ1=0 MHz. The third data comparator 19 outputs 0 (θ1<D2) as the overflow signal. The output value θ2 of the digital adder 13 is θ2=θ1+Ps=0 MHz+16 MHz=16 MHz, since the overflow signal is 0. The output value fd of the pulse generation circuit 17c is fd=1, since the overflow frequency is 2 and D2≦θ2, and the second data holding circuit 18 holds the previous value fout (=0) and the output value fout thereof becomes fout=0.

When the elapsed time is 10/32 MHz (at the timing T2 of fb), the pulse number set value Ps is Vp×n=16 MHz similar to the previous elapsed time, and the first data holding circuit 14 latches the output value θ2 immediately before (elapsed time=9/32 MHz) and the output value θ1 thereof becomes θ1=16 MHz. The third data comparator 19 outputs 1 (θ1≧D2) as the overflow signal. The output value θ2 of the digital adder 13 is θ2=θ1−D2=16 MHz−16 MHz=0 MHz, since the overflow signal is 1. The output value fd of the pulse generation circuit 17c is fd=1, since the overflow frequency is 3 and 0≦θ2<D1, and the second data holding circuit 18 latches the value fd (=1) immediately before and the output value fout thereof becomes fout=1.

Hereinafter, similar operation is performed for the elapsed time 11/32 MHz and the elapsed time 12/32 MHz, . . . , and the output as shown in FIG. 9 can be obtained. The output waveform of the variable-frequency pulse generator in the third embodiment changes corresponding to the change in the speed set value, as in FIG. 4 explained above.

As described above, in the third embodiment, one cycle of the output control of the pulse train fout is changed from four cycles (T1–T4) to two cycles (T1–T2) of the reference clock, by comparing the output θ2 of the digital adder 13 before being held by the first data holding circuit 14, and the second reference value D2, respectively, by the second data comparator 16. The latch timing of the overflow signal is also changed from T4 to T1 of the reference clock fb, by comparing the output θ1 of the first data holding circuit 14 and the second reference value D2 by the third data comparator 19. Thereby, the control cycle can be reduced, and the noise, power consumption and heat generation can be reduced, compared to the conventional art.

Also, in the third embodiment, it is judged whether the overflow frequency is an even number of times or an odd number of times, and the pulses are generated based on the judgment result and the comparison result by the second data comparator 16. Thereby, the number of gates can be reduced than that in the first embodiment.

Fourth Embodiment

Figure 10:
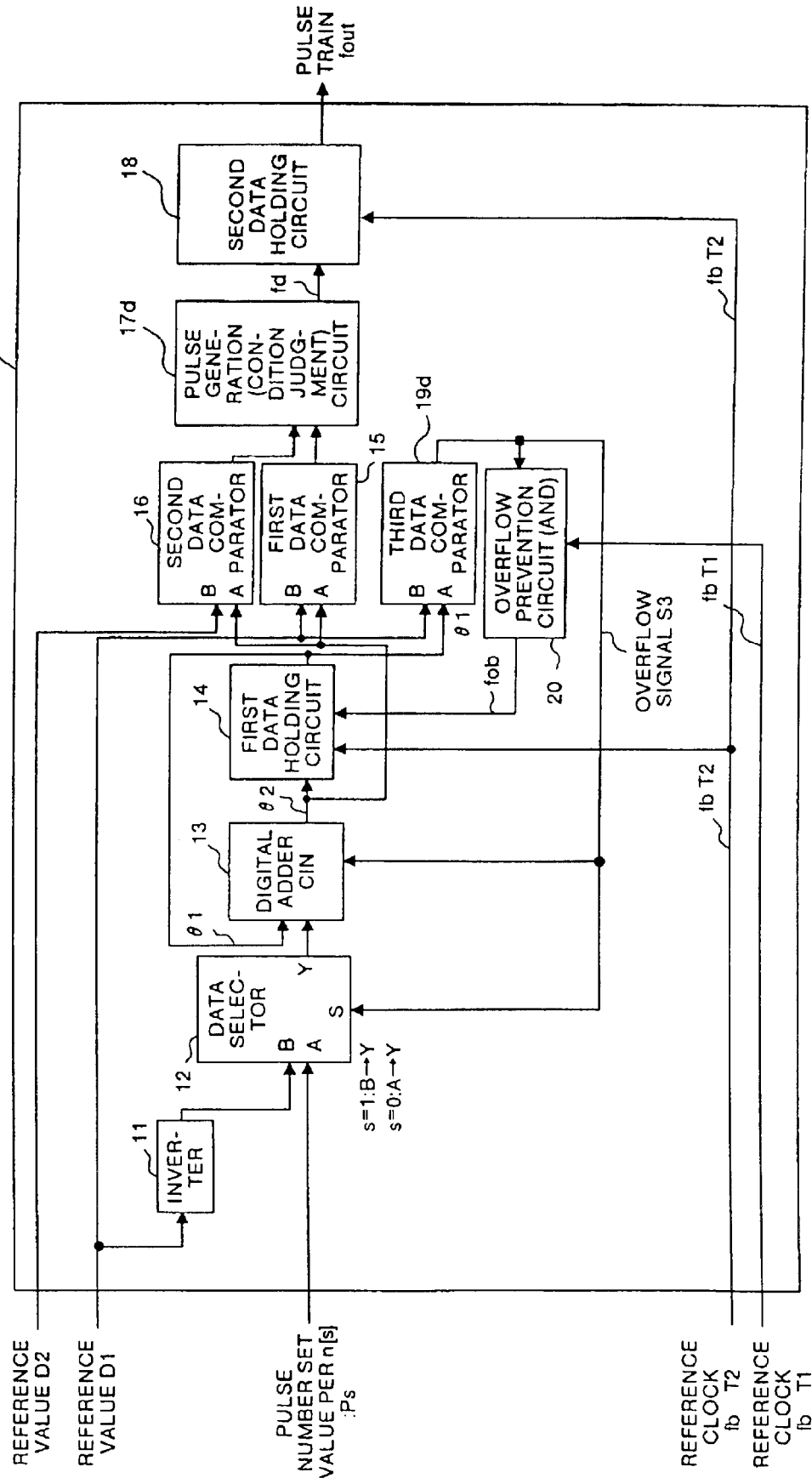
FIG. 10 shows the configuration of a fourth embodiment of the variable-frequency pulse generator according to the present invention.
Figure 12:
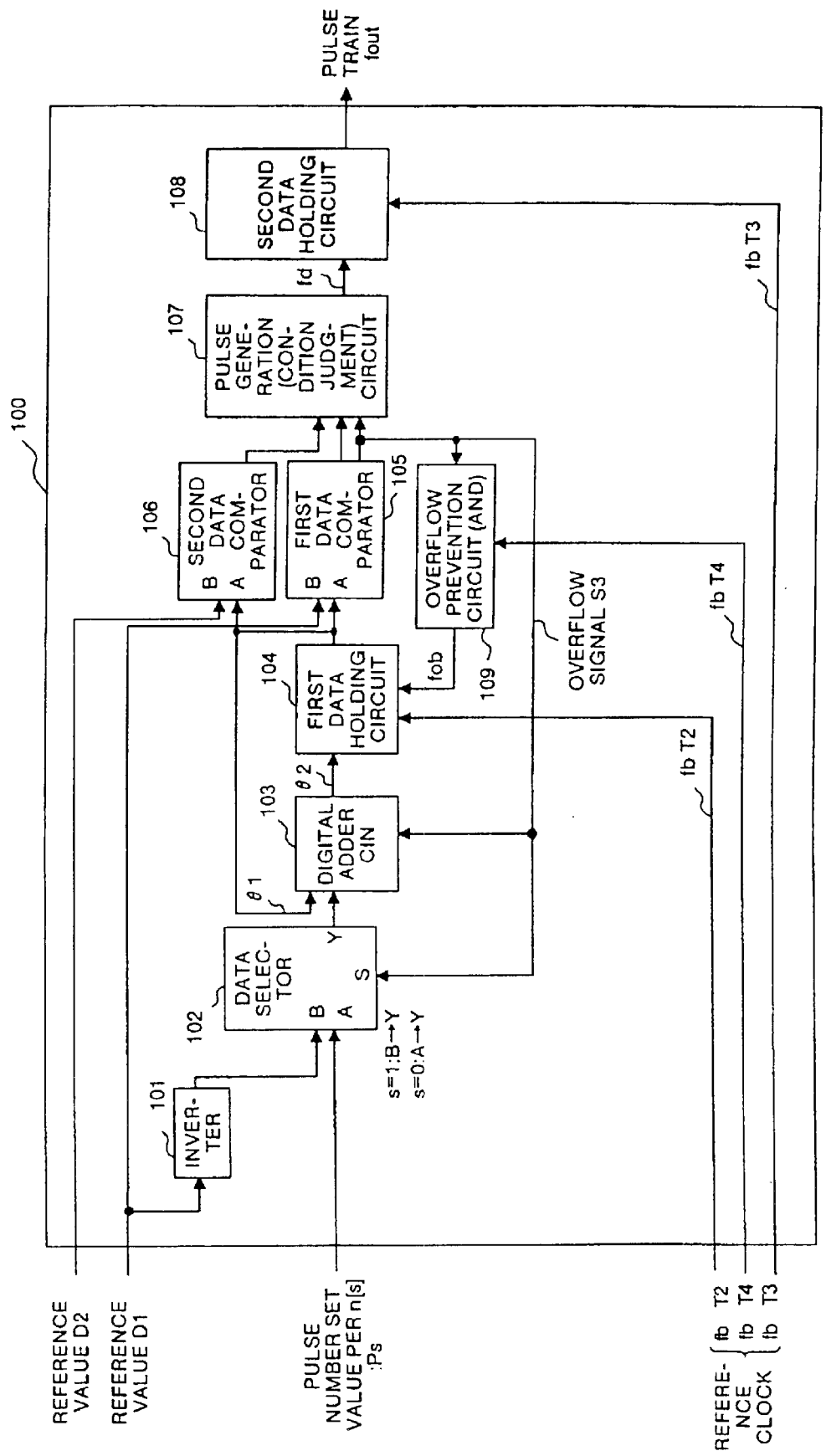
FIG. 12 shows the configuration of a conventional variable-frequency pulse generator.

FIG. 10 shows the configuration of a fourth embodiment of the variable-frequency pulse generator according to the present invention. The same configuration as that of the first embodiment described above is denoted by the same reference symbol, and the explanation thereof is omitted. Only the operation different from that of the first embodiment will be explained herein.

In FIG. 10, the reference symbol id is a variable-frequency pulse generation circuit in the third embodiment, and 17*d* is a pulse generation circuit which judges the output level (High or Low) based on the comparison result of the two data comparators, and 19*d* is a third data comparator which compares the output θ1 of the first data holding circuit 14 and the first reference value D1. In the embodiment, as one example, explanation is given by assuming that the reference clock frequency fb is 32 MHz, and the maximum cycle n of the output pulse is 2 seconds.

The operation of the variable-frequency pulse generator in the fourth embodiment will be explained. When the S terminal is 0 (θ1≦D1), the data selector 12 outputs the pulse number set value Ps (26-bit notation) of the terminal A to the terminal Y, and when the S terminal is 1 (θ1>D1), the data selector 12 outputs the bit inversion value of the reference value D1 of the terminal B to the terminal Y.

When the CIN terminal is 0 (θ1≦D1), the digital adder 13 adds the pulse number set value Ps output from the data selector 12 and the output θ1 of the first data holding circuit 14, and when the CIN terminal is 1 (θ1>D1), the digital adder 13 adds −(fc×n), being the sum of the output of the data selector 12 and CIN=1, and the output θ1 of the first data holding circuit 14, and outputs the addition result θ2 (26-bit notation) for each case.

The pulse generation circuit 17*d* judges the comparison results of the first and second data comparators, and for example, when the comparison results by the both comparators are 0≦θ2<D2 (=(fc/2)×n), outputs 0 as the judgment result fd, and when D2≦θ2<D1 (=fc×n), outputs 1, and when D1≦θ2<(D2×3), outputs 0, and when (D2×3)≦θ2, outputs 1.

The third data comparator 19*d* compares the output θ1 of the first data holding circuit 14 and the first reference value D1, and when θ1≦D1, outputs 0, and when θ1>D1, outputs 1.

The latch timing of the variable-frequency pulse generator in the fourth embodiment is the same as that shown in FIG. 2 explained above, and hence the explanation thereof is omitted.

FIG. 11 shows the output result of each section, when the variable-frequency pulse generator in the fourth embodiment is operated. It is assumed herein that the reference clock fb is 32 MHz, the maximum cycle n of the output pulse is 2 seconds, and the pulse number set value Ps is 8→16 MHz (that is, the speed set value Vp is set to 4→8 MHz). Therefore, the control clock frequency fc becomes 16 MHz, and the first reference value D1 becomes 32 MHz, and the second reference value D2 becomes 16 MHz.

In FIG. 11, for example, at the point of time when the elapsed time is 0 second (initial state: 0/32 MHz), either of the pulse number set value Ps (Vp×n), the output θ1 of the first data holding circuit 14, the overflow signal, the output value θ2 of the digital adder 13, the value fd, and the value fout is 0 (initial value).

When the elapsed time is 1/32 MHz (at the timing T1 of fb), the pulse number set value Ps is Vp×n=4 MHz×2=8 MHz, and the first data holding circuit 14 holds the previous (elapsed time=0 second) output value θ1 (=0). The third data comparator 19*d* outputs 0 (θ1≦D1) as the overflow signal. The output value θ2 of the digital adder 13 is θ2=θ1+Ps=0+8 MHz=8 MHz, since the overflow signal is 0. The output value fd of the pulse generation circuit 17*d* is fd=0, since 0≦θ2<D2, and the output value fout of the second data holding circuit 18 holds the previous fout value, and fout=0.

When the elapsed time is 2/32 MHz (at the timing T2 of fb), the pulse number set value Ps is Vp×n=8 MHz similar to the previous elapsed time, and the first data holding circuit 14 latches the output value θ2 immediately before (elapsed time=1/32 MHz) and the output value θ1 thereof becomes θ1=8 MHz. The third data comparator 19*d* outputs 0 (θ1≦D1) as the overflow signal. The output value θ2 of the digital adder 13 is θ2=θ1+Ps=8 MHz+8 MHz=16 MHz, since the overflow signal is 0. The output value fd of the pulse generation circuit 17*d* is fd=1, since D2≦θ2<D1, and the second data holding circuit 18 latches the value fd (=0) immediately before and the output value fout thereof becomes fout=0.

When the elapsed time is 3/32 MHz (at the timing T1 of fb), the pulse number set value Ps is Vp×n=8 MHz similar to the previous elapsed time, and the first data holding circuit 14 holds the previous (elapsed time=2/32 MHz) output value θ1 (=8 MHz). The third data comparator 19*d* outputs 0 (θ1≦D1) as the overflow signal. The output value θ2 of the digital adder 13 is θ2=θ1+Ps=8 MHz+8 MHz=16 MHz, since the overflow signal is 0. The output value fd of the pulse generation circuit 17*d* is fd=1, since D2≦θ2<D1, and the second data holding circuit 18 holds the previous value fout (=0) and the output value fout thereof becomes fout=0.

When the elapsed time is 4/32 MHz (at the timing T2 of fb), the pulse number set value Ps is Vp×n=8 MHz similar to the previous elapsed time, and the first data holding circuit 14 latches the output value θ2 immediately before (elapsed time=3/32 MHz) and the output value θ1 thereof becomes θ1=16 MHz. The third data comparator 19*d* outputs 0 (θ1≦D1) as the overflow signal. The output value θ2 of the digital adder 13 is θ2=θ1+Ps=16 MHz+8 MHz=24 MHz, since the overflow signal is 0. The output value fd of the pulse generation circuit 17*d* is fd=1, since D2≦θ2<D1, and the second data holding circuit 18 latches the value fd (=1) immediately before and the output value fout thereof becomes fout=1.

When the elapsed time is 5/32 MHz (at the timing T1 of fb), the pulse number set value Ps is Vp×n=8 MHz similar to the previous elapsed time, and the first data holding circuit 14 holds the previous (elapsed time=4/32 MHz) output value θ1 (=16 MHz). The third data comparator 19*d* outputs 0 (θ1≦D1) as the overflow signal. The output value θ2 of the digital adder 13 is θ2=θ1+Ps=16 MHz+8 MHz=24 MHz, since the overflow signal is 0. The output value fd of the pulse generation circuit 17*d* is fd=1, since D2≦θ2<D1, and the second data holding circuit 18 holds the previous value fout (=1) and the output value fout thereof becomes fout=1.

When the elapsed time is 6/32 MHz (at the timing T2 of fb), the pulse number set value Ps is Vp×n=8 MHz similar to the previous elapsed time, and the first data holding circuit 14 latches the output value. θ2 immediately before (elapsed time=5/32 MHz) and the output value θ1 thereof becomes θ1=24 MHz. The third data comparator 19*d* outputs 0 (θ1≦D1) as the overflow signal. The output value θ2 of the digital adder 13 is θ2=θ1+Ps=24 MHz+8 MHz=32 MHz, since the overflow signal is 0. The output value fd of the pulse generation circuit 17d is fd=0, since D1≦θ2<(D2×3), and the second data holding circuit 18 latches the value fd (=1) immediately before and the output value fout thereof becomes fout=1.

When the elapsed time is 7/32 MHz (at the timing T1 of fb), the pulse number set value Ps is Vp×n=8 MHz similar to the previous elapsed time, and the first data holding circuit 14 holds the previous (elapsed time=6/32 MHz) output value θ1 (=24 MHz) The third data comparator 19d outputs 0 (θ1≦D1) as the overflow signal. The output value θ2 of the digital adder 13 is θ2=θ1+Ps=24 MHz+8 MHz=32 MHz, since the overflow signal is 0. The output value fd of the pulse generation circuit 17d is fd=0, since D1≦θ2<(D2×3), and the second data holding circuit 18 holds the previous value fout (=1) and the output value fout thereof becomes fout=1.

When the elapsed time is 8/32 MHz (at the timing T2 of fb), the pulse number set value Ps is Vp×n=8 MHz similar to the previous elapsed time, and the first data holding circuit 14 latches the output value θ2 immediately before (elapsed time=7/32 MHz) and the output value θ1 thereof becomes θ1=32 MHz. The third data comparator 19d outputs 0 (θ1≦D1) as the overflow signal. The output value θ2 of the digital adder 13 is θ2=θ1+Ps=32 MHz+8 MHz=40 MHz, since the overflow signal is 0. The output value fd of the pulse generation circuit 17d is fd=0, since D1≦θ2<(D2×3), and the second data holding circuit 18 latches the value fd (=0) immediately before and the output value fout thereof becomes fout=0.

When the elapsed time is 9/32 MHz (at the timing T1 of fb), the pulse number set value Ps is changed to Vp×n=16 MHz, and the first data holding circuit 14 holds the previous (elapsed time=8/32 MHz) output value θ1 (=32 MHz). The third data comparator 19d outputs 0 (θ1≦D1) as the overflow signal. The output value θ2 of the digital adder 13 is θ2=θ1+Ps=32 MHz+16 MHz=48 MHz, since the overflow signal is 0. The output value fd of the pulse generation circuit 17d is fd=1, since (D2×3)≦θ2, and the second data holding circuit 18 holds the previous value fout (=0) and the output value fout thereof becomes fout=0.

When the elapsed time is 10/32 MHz (at the timing T2 of fb), the pulse number set value Ps is Vp×n=16 MHz similar to the previous elapsed time, and the first data holding circuit 14 latches the output value θ2 immediately before (elapsed time=9/32 MHz) and the output value θ1 thereof becomes θ1=48 MHz. The third data comparator 19d outputs 1 (θ1>D1) as the overflow signal. The output value θ2 of the digital adder 13 is θ2=θ1−D1=48 MHz−32 MHz=16 MHz, since the overflow signal is 1. The output value fd of the pulse generation circuit 17d is fd=1, since D2≦θ2<D1, and the second data holding circuit 18 latches the value fd (=1) immediately before and the output value fout thereof becomes fout=1.

Hereinafter, similar operation is performed for the elapsed time 11/32 MHz and the elapsed time 12/32 MHz, and the output as shown in FIG. 11 can be obtained. The output waveform of the variable-frequency pulse generator in the fourth embodiment changes corresponding to the change in the speed set value, as in FIG. 4 explained above.

As described above, in the fourth embodiment, one cycle of the output control of the pulse train fout is changed from four cycles (T1–T4) to two cycles (T1–T2) of the reference clock, by comparing the output θ2 of the digital adder 13 before being held by the first data holding circuit 14, the first reference value D1 and the second reference value D2, respectively, by the first data comparator 15 and the second data comparator 16. The latch timing of the overflow signal is also changed from T4 to T1 of the reference clock fb. Thereby, the control cycle can be reduced, and the noise, power consumption and heat generation can be reduced, compared to the conventional art.

As described above, according to the present invention, the output of the addition unit before being held by the data holding unit, the first reference value and the second reference value are compared, respectively, by the first comparison unit and the second comparison unit, to thereby change one cycle of the output control of the pulse train from four cycles (T1–T4) to two cycles (T1–T2) of the reference clock. Further, by comparing the output of the data holding unit and the first reference value by the third comparison unit, the latch timing of the overflow signal is changed from the fourth cycle (T4) to the first cycle (T1). Thereby, the control cycle can be reduced, and hence there is the effect that the noise, power consumption and heat generation can be reduced, compared to the conventional art.

According to the next invention, the output of the addition unit before being held by the data holding unit, the first reference value and the second reference value are compared, respectively, by the first comparison unit and the second comparison unit, to thereby change one cycle of the output control of the pulse train from four cycles (T1–T4) to two cycles (T1–T2) of the reference clock. Further, when the subtraction unit subtracts the first reference value from the output value of the addition unit, and the comparison result by the first comparison unit satisfies "addition result≧first reference value", the selection unit prevents the overflow of the addition unit by selecting/outputting the subtraction result. Thereby, the control cycle can be reduced, and hence there is the effect that the noise, power consumption and heat generation can be reduced, compared to the conventional art.

According to the next invention, it is judged whether the overflow frequency is even number of times or odd number of times, and the pulses are generated based on the judgment result and the comparison result by the second comparison unit. Thereby, there is the effect that the number of gates can be considerably reduced.

According to the next invention, the output of the addition unit before being held by the data holding unit, the first reference value and the second reference value are compared, respectively, by the first comparison unit and the second comparison unit, to thereby change one cycle of the output control of the pulse train from four cycles (T1–T4) to two cycles (T1–T2) of the reference clock. Further, by comparing the output of the data holding unit and the first reference value by the third comparison unit, the latch timing of the overflow signal is changed from the fourth cycle (T4) to the first cycle (T1). Thereby, the control cycle can be reduced, and hence there is the effect that the noise, power consumption and heat generation can be reduced, compared to the conventional art.

INDUSTRIAL APPLICABILITY

As described above, the variable-frequency pulse generator according to the present invention is useful for a variable-frequency pulse generator which generates a pulse train of a desired frequency, and particularly useful for all apparatus which uses a variable-frequency pulse generator in which the noise, power consumption and heat generation within the apparatus considerably increase due to speed-up of the reference block.

What is claimed is:

1. A variable-frequency pulse generator which executes one cycle of output control of the pulse train by two cycles of a reference clock, comprising:

an inversion unit which inverts a first reference value regulated by the reference clock;

a selection unit which selects the first reference value after inversion, when an overflow has occurred, and in any other event selects a predetermined value which changes depending on a set speed;

a data holding unit which latches an output of a previous stage, being the present value of a result of addition, in the second cycle of the reference clock and at a predetermined timing of an overflow prevention signal;

an addition unit which adds the value selected by the selection unit and the data latched by the data holding unit;

a first comparison unit which compares the value obtained by the addition unit as a result of addition and the first reference value;

a second comparison unit which compares the value obtained by the addition unit as a result of addition and a second reference value which is half of the first reference value;

a judgment unit which judges whether a condition "0≦addition result<second reference value" is satisfied, or whether a condition "second reference value≦addition result<first reference value" is satisfied, or whether a condition "first reference value≦addition result" is satisfied, and outputs a specified signal corresponding to a result of the judgment;

a pulse train output unit which latches the specified signal at a predetermined timing of the second cycle of the reference clock, and outputs a pulse train of a desired frequency;

a third comparison unit which compares the data latched by the data holding unit and the first reference value, and when a condition "latched data≧first reference value" is satisfied, judges that the overflow has occurred; and an overflow prevention unit which outputs the overflow prevention signal at a predetermined timing of the first cycle of the reference clock, when the third comparison unit has judged that the overflow has occurred.

2. A variable-frequency pulse generator which executes one cycle of output control of the pulse train by two cycles of a reference clock, comprising:

an addition unit which adds a predetermined value, which changes depending on a set speed, and data latched at a predetermined timing of the second cycle of the reference clock;

a subtraction unit which subtracts a first reference value regulated by the reference clock from the value obtained by the addition unit as a result of addition;

a first comparison unit which compares the value obtained by the addition unit as a result of addition and the first reference value, and when a condition "addition result≧first reference value" is satisfied, judges that an overflow has occurred;

a second comparison unit which compares the value obtained by the addition unit as a result of addition and a second reference value which is half of the first reference value;

a selection unit which selects the value obtained by the subtraction unit as a result of subtraction when the overflow has occurred, and in any other event selects the value obtained by the addition unit as a result of addition;

a data holding unit which latches the value selected by the selection unit at a predetermined timing of the second cycle of the reference clock;

a judgment unit which judges based on each the results of comparisons in the first comparison unit and the second comparison unit, whether a condition "0≦addition result<second reference value" is satisfied, or whether a condition "second reference value≦addition result<first reference value" is satisfied, or whether a condition "first reference value≦addition result" is satisfied, and outputs a specified signal according to a result of the judgment; and a pulse train output unit which latches the specified signal at a predetermined timing of the second cycle of the reference clock, and outputs a pulse train of a desired frequency.

3. A variable-frequency pulse generator which executes one cycle of output control of the pulse train by two cycles of a reference clock, comprising:

an inversion unit which inverts a reference value regulated by the reference clock;

a selection unit which selects the reference value after inversion, when an overflow has occurred, and in any other event selects a predetermined value which changes depending on a set speed;

a data holding unit which latches an output of a previous stage, being the present value of a result of addition, in the second cycle of the reference clock and at a predetermined timing of an overflow prevention signal;

an addition unit which adds the value selected by the selection unit and the data latched by the data holding unit;

a first comparison unit which compares the value obtained by the addition unit as a result of addition and the reference value;

a judgment unit which judges whether a condition "the overflow frequency is an even number" and "0≦addition result<reference value" is satisfied, or whether a condition "the overflow frequency is an even number" and "reference value≦addition result" is satisfied, or whether conditions "the overflow frequency is an odd number" and "0≦addition result<reference value" are satisfied, or whether conditions "the overflow frequency is an odd number" and "reference value≦addition result" are satisfied, and outputs a specified signal corresponding to a result of the judgment;

a pulse train output unit which latches the specified signal at a predetermined timing of the second cycle of the reference clock, and outputs a pulse train of a desired frequency;

a second comparison unit which compares the data latched by the data holding unit and the reference value, and when a condition "latched data≧reference value" is satisfied, judges that the overflow has occurred; and an overflow prevention unit which outputs the overflow prevention signal at a predetermined timing of the first cycle of the reference clock, when the second comparison unit has judged that the overflow has occurred.

4. A variable-frequency pulse generator which executes one cycle of output control of the pulse train by two cycles of a reference clock, comprising:

an inversion unit which inverts a first reference value regulated by the reference clock;

a selection unit which selects the first reference value after inversion, when an overflow has occurred, and in any other event selects a predetermined value which changes depending on a set speed;

a data holding unit which latches an output of a previous stage, being the present value of a result of addition, in the second cycle of the reference clock and at a predetermined timing of the overflow prevention signal;

an addition unit which adds the value selected by the selection unit and the data latched by the data holding unit;

a first comparison unit which compares the value obtained by the addition unit as a result of addition and the first reference value;

a second comparison unit which compares the value obtained by the addition unit as a result of addition and a second reference value which is half of the first reference value;

a judgment unit which judges whether a condition "0≦addition result<second reference value" is satisfied, or whether a condition "second reference value≦addition result<first reference value" is satisfied, or whether a condition "first reference value≦addition result<(second reference value×3)" is satisfied, or whether a condition "(second reference value×3)≦addition result" is satisfied, and outputs a specified signal corresponding to a result of the judgment;

a pulse train output unit which latches the specified signal at a predetermined timing of the second cycle of the reference clock, and outputs a pulse train of a desired frequency;

a third comparison unit which compares the data latched by the data holding unit and the first reference value, and when a condition "latched data>first reference value" is satisfied, judges that the overflow has occurred; and an overflow prevention unit which outputs the overflow prevention signal at a predetermined timing of the first cycle of the reference clock, when the third comparison unit has judged that the overflow has occurred.

5. A variable-frequency pulse generator which executes one cycle of output control of the pulse train by two cycles of a reference clock, comprising:

an inversion unit which inverts a first reference value regulated by the reference clock;

a selection unit which selects the first reference value after inversion, when an overflow has occurred, and in any other event selects a predetermined value which changes depending on a set speed;

a data holding unit which latches an output of a previous stage, being the present value of a result of addition, in the second cycle of the reference clock and at a predetermined timing of an overflow prevention signal;

an addition unit which adds the value selected by the selection unit and the data latched by the data holding unit;

a first comparison unit which compares the value obtained by the addition unit as a result of addition and the first reference value;

a second comparison unit which compares the value obtained by the addition unit as a result of addition and a second reference value which is a portion of the first reference value;

a judgment unit which judges whether a first, second or third condition is satisfied, and outputs a specified signal corresponding to a result of the judgment; and a pulse train output unit which latches the specified signal at a predetermined timing of the second cycle of the reference clock, and outputs a pulse train of a desired frequency.

6. The variable-frequency pulse generator of claim 5, wherein the second reference value is half of the first reference value.

7. The variable-frequency pulse generator of claim 5, further comprising a third comparison unit which compares the data latched by the data holding unit and the first reference value, and when a fourth condition is satisfied, judges that the overflow has occurred.

8. The variable-frequency pulse generator of claim 7, further comprising an overflow prevention unit which outputs the overflow prevention signal at a predetermined timing of the first cycle of the reference clock, when the third comparison unit has judged that the overflow has occurred.

9. The variable-frequency pulse generator of claim 5, wherein said first condition is a 0≦addition result<second reference value condition, the second condition is a second reference value≦addition result<first reference value, and the third condition is a first reference value≦addition result condition.

10. The variable-frequency pulse generator of claim 7, wherein said fourth condition is a latched data≧first reference value condition.

11. A variable-frequency pulse generator which executes one cycle of output control of the pulse train by two cycles of a reference clock, comprising:

an addition unit which adds a predetermined value, which changes depending on a set speed, and data latched at a predetermined timing of the second cycle of the reference clock;

a subtraction unit which subtracts a first reference value regulated by the reference clock from the value obtained by the addition unit as a result of addition;

a first comparison unit which compares the value obtained by the addition unit as a result of addition and the first reference value, and when a first condition is satisfied, judges that an overflow has occurred;

a second comparison unit which compares the value obtained by the addition unit as a result of addition and a second reference value which is a portion of the first reference value;

a selection unit which selects the value obtained by the subtraction unit as a result of subtraction when the overflow has occurred, and in any other event selects the value obtained by the addition unit as a result of addition;

a data holding unit which latches the value selected by the selection unit at a predetermined timing of the second cycle of the reference clock;

a judgment unit which judges based on the results of at least one of the comparisons in the first comparison unit and the second comparison unit, whether a second, third or fourth condition is satisfied, and outputs a specified signal according to a result of the judgment; and a pulse train output unit which latches the specified signal at a predetermined timing of the second cycle of the reference clock, and outputs a pulse train of a desired frequency.

12. The variable-frequency pulse generator of claim 11, wherein said first condition is an addition result≧first reference value condition.

13. The variable-frequency pulse generator of claim 11, wherein said second reference value is half of said first reference value.

14. The variable-frequency pulse generator of claim 11, wherein the judgment unit judges based on each of the results of comparisons in the first and second comparison units.

15. The variable-frequency pulse generator of claim 11, wherein said second condition is a 0≦addition result<second reference value condition, said third condition is a second reference value≦addition result<first reference value condition, and said fourth condition is a first reference value≦addition result condition.

16. A variable-frequency pulse generator which executes one cycle of output control of the pulse train by two cycles of a reference clock, comprising:
- an inversion unit which inverts a reference value regulated by the reference clock;
- a selection unit which selects the reference value after inversion, when an overflow has occurred, and in any other event selects a predetermined value which changes depending on a set speed;
- a data holding unit which latches an output of a previous stage, being the present value of a result of addition, in the second cycle of the reference clock and at a predetermined timing of an overflow prevention signal;
- an addition unit which adds the value selected by the selection unit and the data latched by the data holding unit;
- a first comparison unit which compares the value obtained by the addition unit as a result of addition and the reference value;
- a judgment unit which judges whether a first, second, third or fourth condition are satisfied, and outputs a specified signal corresponding to a result of the judgment; and a pulse train output unit which latches the specified signal at a predetermined timing of the second cycle of the reference clock, and outputs a pulse train of a desired frequency.

17. The variable-frequency pulse generator of claim 16, wherein said first condition is a condition where an overflow frequency is an even number and 0≦addition result<reference value, said second condition is a condition where said overflow frequency is an even number and reference value≦addition result, said third condition is a condition where the overflow frequency is an odd number and 0≦addition result<reference value, and said fourth condition is a condition where the overflow frequency is an odd number and reference value≦addition result.

18. The variable-frequency pulse generator of claim 16, further comprising a second comparison unit which compares the data latched by the data holding unit and the reference value, and when a fifth condition is satisfied, judges that the overflow has occurred.

19. The variable frequency pulse generator of claim 18, wherein said fifth condition is a latched data≧reference value condition.

20. The variable-frequency pulse generator of claim 18, further comprising an overflow prevention unit which outputs the overflow prevention signal at a predetermined timing of the first cycle of the reference clock, when the second comparison unit has judged that the overflow has occurred.

21. A variable-frequency pulse generator which executes one cycle of output control of the pulse train by two cycles of a reference clock, comprising:
- an inversion unit which inverts a first reference value regulated by the reference clock;
- a selection unit which selects the first reference value after inversion, when an overflow has occurred, and in any other event selects a predetermined value which changes depending on a set speed;
- a data holding unit which latches an output of a previous stage, being the present value of a result of addition, in the second cycle of the reference clock and at a predetermined timing of the overflow prevention signal;
- an addition unit which adds the value selected by the selection unit and the data latched by the data holding unit;
- a first comparison unit which compares the value obtained by the addition unit as a result of addition and the first reference value;
- a second comparison unit which compares the value obtained by the addition unit as a result of addition and a second reference value which is a portion of the first reference value;
- a judgment unit which judges whether a first, second, third or fourth condition is satisfied, and outputs a specified signal corresponding to a result of the judgment; and
- a pulse train output unit which latches the specified signal at a predetermined timing of the second cycle of the reference clock, and outputs a pulse train of a desired frequency.

22. The variable-frequency generator of claim 21, wherein said second reference value is half of said first reference value.

23. The variable-frequency generator of claim 21, wherein said first condition is a 0≦addition result<second reference value condition, said second condition is a second reference value≦addition result<first reference value condition, said third condition is a first reference value≦addition result<(second reference value×3) condition, and said fourth condition is a (second reference value×3)≦addition result condition.

24. The variable-frequency generator of claim 21, further comprising a third comparison unit which compares the data latched by the data holding unit and the first reference value, and when a fifth condition is satisfied, judges that the overflow has occurred.

25. The variable-frequency generator of claim 24, wherein said fifth condition is a latched data>first reference value condition.

26. The variable-frequency generator of claim 24, further comprising an overflow prevention unit which outputs the overflow prevention signal at a predetermined timing of the first cycle of the reference clock, when the third comparison unit has judged that the overflow has occurred.

* * * * *